United States Patent
Ryaboy

(10) Patent No.: US 10,024,381 B2
(45) Date of Patent: Jul. 17, 2018

(54) TUNABLE VIBRATION DAMPERS AND METHODS OF MANUFACTURE AND TUNING

(71) Applicant: NEWPORT CORPORATION, Irvine, CA (US)

(72) Inventor: Vyacheslav M. Ryaboy, Irvine, CA (US)

(73) Assignee: NEWPORT CORPORATION, Irvine, CA (US)

( * ) Notice: Subject to any disclaimer, the term of this patent is extended or adjusted under 35 U.S.C. 154(b) by 0 days.

(21) Appl. No.: 15/280,904

(22) Filed: Sep. 29, 2016

(65) Prior Publication Data

US 2017/0016510 A1    Jan. 19, 2017

Related U.S. Application Data

(62) Division of application No. 14/484,210, filed on Sep. 11, 2014, which is a division of application No. (Continued)

(51) Int. Cl.
| | |
|---|---|
| F16F 7/10 | (2006.01) |
| F16F 15/02 | (2006.01) |
| F16F 7/116 | (2006.01) |
| B23P 6/00 | (2006.01) |
| F16F 7/104 | (2006.01) |
| G01M 5/00 | (2006.01) |

(52) U.S. Cl.
CPC ............... *F16F 15/02* (2013.01); *B23P 6/00* (2013.01); *F16F 7/104* (2013.01); *F16F 7/116* (2013.01); *G01M 5/0066* (2013.01); *Y10T 29/49718* (2015.01)

(58) Field of Classification Search
CPC .. F16F 7/104; F16F 7/116; F16F 7/108; F16F 1/027; F16F 1/22; F16F 1/30; F16F 1/26; F16F 15/022; F16F 15/073; F16F 2238/022; F16F 15/02
USPC ........... 188/378, 379, 380; 267/140.2, 140.3, 267/140.4
See application file for complete search history.

(56) References Cited

U.S. PATENT DOCUMENTS

| | | |
|---|---|---|
| 5,020,644 A | 6/1991 | Novoa |
| 5,433,302 A | 7/1995 | Heide |
| (Continued) | | |

FOREIGN PATENT DOCUMENTS

| | | |
|---|---|---|
| JP | H11-506396 | 6/1999 |
| JP | 2000-018299 | 1/2000 |
| (Continued) | | |

OTHER PUBLICATIONS

Non-Final Office Action dated Feb. 1, 2018 in U.S. Appl. No. 15/280,894, filed Sep. 29, 2016, published as: 2017-0016509 on: Jan. 19, 2017.

*Primary Examiner* — Nicholas J Lane
(74) *Attorney, Agent, or Firm* — Schmeiser, Olsen & Watts LLP

(57) ABSTRACT

Embodiments are directed to tunable damper embodiments and methods of using the same for damping resonant and non-resonant vibrations present within an object that the tunable damper is secured to. In some cases, the tunable damper may be tuned before, during or after being secured to an object.

6 Claims, 15 Drawing Sheets

Related U.S. Application Data

13/338,164, filed on Dec. 27, 2011, now Pat. No. 8,857,585.

(60) Provisional application No. 61/428,211, filed on Dec. 29, 2010.

(56) References Cited

U.S. PATENT DOCUMENTS

| | | |
|---|---|---|
| 6,412,348 B1 | 7/2002 | Iemura et al. |
| 6,422,540 B1 | 7/2002 | Pfletschinger et al. |
| 6,443,673 B1 * | 9/2002 | Etling ............... B23B 29/022 |
| | | 188/379 |
| 2003/0048060 A1 | 3/2003 | Lee |
| 2003/0172714 A1 | 9/2003 | Maeno |
| 2006/0119026 A1 * | 6/2006 | Ryaboy ............... F16F 15/02 |
| | | 267/140.15 |
| 2009/0246703 A1 | 10/2009 | Starreveld et al. |

FOREIGN PATENT DOCUMENTS

| | | |
|---|---|---|
| JP | 2001-049880 | 2/2001 |
| JP | 2001-332206 | 11/2001 |
| JP | 2009-127768 | 6/2009 |

* cited by examiner

TUNABLE VIBRATION DAMPERS AND METHODS OF MANUFACTURE AND TUNING

RELATED APPLICATIONS

This application is a divisional of U.S. patent application Ser. No. 14/484,210, titled Tunable Vibration Dampers and Methods of Manufacture and Tuning, filed Sep. 11, 2014, by Vyacheslav M. Ryaboy, which is a divisional of U.S. patent application Ser. No. 13/338,164, now U.S. Pat. No. 8,857, 585, titled Tunable Vibration Dampers and Methods of Manufacture and Tuning, filed Dec. 27, 2011 and issued Oct. 14, 2014, by Vyacheslav M. Ryaboy, which claims priority from U.S. Provisional Patent Application Ser. No. 61/428, 211, titled Tunable Vibration Damper for an Optical Table and Methods of Manufacture, filed Dec. 29, 2010, by Vyacheslav M. Ryaboy, all of which are incorporated by reference herein in their entirety.

BACKGROUND

Optical tables are presently used in a wide variety of applications and environments. Commonly, the term optical table refers to any platform supporting vibration-sensitive equipment such as optical assemblies, biological experiments and/or equipment, or high-precision semiconductor manufacturing systems. Typical optical tables consist of at least one sandwich structure having two faceplates enclosing a lightweight honeycomb core. Due to low weight-to-stiffness ratios, these platforms find wide applications in optical research and high-precision manufacturing, usually in conjunction with soft pneumatic vibration isolators. Although good isolation from floor vibration can be achieved in these systems, the platform deviates from the ideal rigid-body behavior at natural frequencies of its flexural resonance vibrations. Those resonance vibrations may be mitigated by various types of dampers or damping systems.

While existing tuned dampers have proven useful in such applications, a number of design challenges remain. For example, a body serving as a moving mass of a damper may be required to move, in the frequency range of interest, linearly and uni-axially in the direction of modal vibration of the main structure, which may be in the normal (usually vertical) direction in case of an optical table. If the mass does not move in a prescribed manner, but rather exhibits rotational modes in the frequency range of interest, the damper may be ineffective. Further, manufacturing these devices has proven time-consuming as a hermetic seal is often required to ensure the damper fluid remains in place.

Further, the tuning characteristics of presently available tuned damper systems are often factory determined and set. As such, adjustments at a work site to correct for changing work environments or needs tends to be difficult if not impossible. Thus, in light of the foregoing, there is a need for tunable vibration damper systems for use with a variety of desired optical table assemblies, or the like, that are reliable, easily manufactured, easily adjusted or tuned and/or stable under varying temperatures.

SUMMARY

Some embodiments of a tunable damper assembly include a frame that provides structural rigidity between at least one base plate and at least one cover plate. The tunable damper assembly may further include a moveable damper mass disposed in the frame and at least one flexible mass engaging member configured to elastically support the movable damper mass. In addition, at least one engaging device may be positioned between the mass engaging member and damper mass and configured to affect the flexing of the mass engaging member upon movement of the damper mass. Furthermore, at least one load mechanism may be operatively coupled to a load plate and one or more engaging member supports, wherein the load mechanism, load plate and engaging member supports are configured to apply a biasing force to the one or more mass engaging members.

Some embodiments are directed to a tunable damper assembly including a frame that provides structural rigidity between at least one base plate and at least one cover plate. The tunable damper assembly further including a moveable damper mass disposed in the frame and at least one flexible mass engaging member configured to elastically support the movable damper mass. In addition, at least one engaging device may be positioned between the mass engaging member and damper mass and configured to affect the flexing of the mass engaging member upon movement of the damper mass. Furthermore, at least one load mechanism may be operatively coupled to a load plate and one or more engaging member supports, wherein the load mechanism, load plate and engaging member supports are configured to apply a biasing force to the one or more mass engaging members. In some embodiments of the tunable damper assembly, the mass engaging member may be assembled with a highly damped element that experiences shear deformation during the flexural motion of the mass engaging member upon movement of the damper mass.

Some embodiments of a tunable vibration damper assembly may include a housing including at least one sidewall, at least one base plate and at least one cover plate which are assembled to form at least one chamber configured to receive a moveable mass. The tunable damper assembly may further include a moveable damper mass disposed in the at least one chamber, the damper mass having a rectangular box shape including a top surface and a bottom surface. A first mass engaging member may be disposed adjacent the top surface of the damper mass and a second mass engaging member may be positioned adjacent the bottom surface of the damper mass. In some cases, the first mass engaging member and the second mass engaging member may include a flat plate configuration having a first surface parallel to a second surface with the second surface facing the damper mass. The flat plate of the first and second mass engaging members may include a resilient spring material configured to elastically support the movable damper mass. A first pair of engaging devices may be positioned between the first mass engaging member and the top surface of the damper mass. A second pair of engaging devices may be positioned between the second mass engaging member and the bottom surface of the damper mass. The first pair of engaging devices may be configured as a pair of substantially parallel extruded elongate bodies extending along the length of the top surface of the damper mass and engaging the second surface of the first mass engaging member. The second pair of engaging devices may include a pair of substantially parallel extruded elongate bodies extending along the length of the bottom surface of the damper mass and engaging the second surface of the second mass engaging member. At least one load mechanism may be threadedly engaged to a load plate of the assembly. The load plate may include a flat plate having a first side parallel to and facing the top plate. The load plate may also include a second side having engaging member supports extending along opposing sides of the second side of the load plate. The engaging member supports may have a sloped or curved surface or profile, wherein the load mechanism, load plate and engaging member supports are configured to apply a biasing force to the first and second mass engaging members. Highly damped elements may be secured to the first surface of the first mass engaging member and second mass engaging member respectively. The highly damped elements may be disposed along opposing sides of the first surface of the first mass engaging member and second mass engaging member. One set of highly damped elements may also be disposed between the first mass engaging member and adjacent sloped or curved surfaces or profiles of engaging member supports. Another set of highly damped elements may be disposed between the second mass engaging member and adjacent sloped or curved surfaces or profiles of engaging member supports. In some cases, the highly damped elements are configured to undergo shear deformation upon movement of the damper mass so as to dissipate vibrational energy of the damper mass.

Some embodiments of a method of damping an object include providing a tunable damper assembly having a frame that provides structural rigidity between at least one base plate and at least one cover plate. The tunable damper assembly may also include a moveable damper mass disposed in the frame between the base plate and cover plate and at least one flexible mass engaging member configured to elastically support the movable damper mass. The assembly may also include at least one mass engaging device disposed between the mass engaging member and damper mass. At least one load mechanism may be operatively coupled to a load plate and one or more engaging member supports such that the load mechanism, load plate and engaging member supports are configured to apply a biasing force to the at least one mass engaging member and adjust the mechanical compliance of the mass engaging member. A highly damped element may be disposed on the at least one flexible mass engaging member between an engaging member support and the mass engaging member. Thereafter, a resonance frequency of the object may be determined and the load mechanism adjusted to match a resonance frequency range of the tunable damper assembly and the resonance frequency of the object. Thereafter, the tunable damper assembly may be secured or otherwise operatively coupled to the object to provide damping.

Some embodiments of a method of tuning a tunable damper assembly to the desired resonance frequency include defining an excitation frequency, $f_{excitation}$, for a required tuned resonance frequency $f_{tuned}$ using a formula derived from an appropriate model of a shaker and tunable damper assembly. The tunable damper assembly may then be mechanically coupled to a platform of the shaker. A vibration sensor may be secured to the tunable damper assembly housing or to the platform of the shaker and the shaker driven to provide a constant-amplitude sinusoidal force at frequency $f_{excitation}$. Thereafter, a load mechanism of the tunable damper assembly may be adjusted by adjusting a biasing force to at least one mass engaging member of the tunable damper assembly and so as to adjust a mechanical compliance of the mass engaging member so as to minimize the output of the sensor.

Some embodiments of a method of reducing vibration in an object include operatively coupling one or more vibration sensors to an object, measuring vibration in the object with the vibration sensor and outputting the measured vibration characteristics. In some cases, the measured vibration characteristics may output on a display. Thereafter, a load mechanism of the tunable vibration damper assembly may be adjusted by adjusting a biasing force to at least one mass engaging member of the tunable damper assembly and so as to adjust a mechanical compliance of the mass engaging member until a desired or acceptable measured vibration characteristics is displayed on the display.

Certain embodiments are described further in the following description, examples, claims and drawings. These features of embodiments will become more apparent from the following detailed description when taken in conjunction with the accompanying exemplary drawings.

Figure 1:
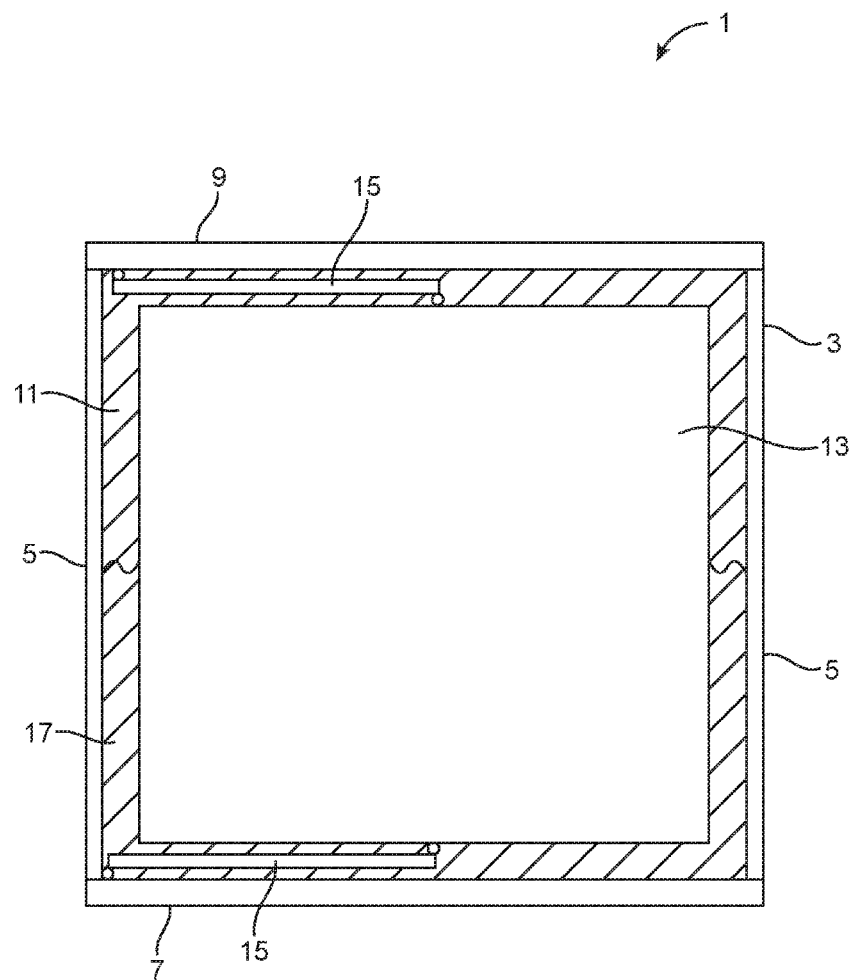
FIG. 1 illustrates an example embodiment of a prior art damping system embodiment.

The drawings illustrate embodiments of the technology and are not limiting. For clarity and ease of illustration, the drawings may not be made to scale and, in some instances, various aspects may be shown exaggerated or enlarged to facilitate an understanding of particular embodiments.

DETAILED DESCRIPTION

As discussed above generally, there is a need for a damper assembly that can be easily tuned and manufactured in a timely and cost efficient manner. In addition, there is a need for a tunable damper that can be easily tuned by an end user. Furthermore, there is a need for a tunable damper that may be tuned before, during, and/or after being operatively coupled to an object.

Embodiments discussed herein include a tunable damper assembly which may provide a user with the ability to tune the tunable damper before, during, and/or after being operatively coupled to an object, such as an optical table, in order to enable the tunable damper to damp resonant and non-resonant vibrations of the object. Embodiments of tunable dampers disclosed herein may be used to reduce the amplitude of mechanical vibrations at a variety of resonant and non-resonant frequencies present in objects. For example, some tunable dampers may be configured such that they are optimal for reducing vibration in objects that have low resonance and non-resonant frequencies (for example, below 100 Hz). Additionally, some tunable dampers may be configured such that they are optimal for use with objects that have medium resonance and non-resonant frequencies and/or high resonance and non-resonant frequencies (i.e., above approximately 100 Hz). In general, tunable dampers described herein may be assembled and/or tunable in any number of ways in order to achieve damping over any number of narrow or wide ranges of resonance frequencies or other non-resonance frequencies.

Passive vibration control devices (dampers) of various designs are widely used in construction of optical tables. The "Shock and Vibration Handbook", ed. by C. M. Harris, 4$^{th}$ edition, 1996, chapter 37, provides a survey of the state of the art in this field and a classification of dampers (damping systems and treatments). Exemplary damping systems include: free-layer damping treatments, where the energy is dissipated by means of extensional deformation of a damping layer (e.g. visco-elastic material) induced by flexural vibration of the base structure; constrained-layer damping treatments, where the constraining layer helps induce relatively large shear deformations in the visco-elastic layer in response to flexural vibration of the base structure, thereby providing a more effective energy dissipation mechanism; integral damping treatments, including use of damped laminated sheets and/or damped joints in the construction assembly; damping links, i.e., visco-elastic elements joining two parts of the structure that experience large relative motion in process of vibration.

Tuned dampers, also known as tuned mass dampers or dynamic vibration absorbers, are essentially mass-spring systems having resonances matched (tuned) to the resonance frequency of a base structure. The application or use of a tuned damper may replace the resonance peak of the base structure, typically, by two peaks of significantly lower amplitudes, and accordingly may enhance transient attenuation. Generally, mass dampers are known to be the most effective among the known means of passive damping. General principles of design, tuning and application of tuned mass dampers are presented in numerous handbooks, research monographs and papers, among them: Shock and Vibration Handbook, ed. by C. M. Harris, 4$^{th}$ edition, 1995, Chapter 6; Dynamic Vibration Absorbers: Theory and Technical Applications, by B. G. Korenev, L. M. Reznikov, (in Russian): Moscow, Nauka Publishers, 1988; English translation: John Wiley and Sons, 1993; Vibration Damping, by A. D. Nashif, D. I. G. Johns, J. P. Henderson, John Wiley and Sons, 1985; Analytical solutions to optimization of dynamic vibration absorbers attached to damped linear systems, by T. Asami, O. Nishihara, A. M. Baz, Trans. ASME Journal of Vibration and Acoustics, 2002, 124, No. 2, p. 284-295; and Smart Tuned-Mass Dampers, by K. E. Smith, J. R. Maly and C. D. Johnson. Proceedings of the ADPA/AIAA/ASME/SPIE Conference on Active Materials and Adaptive Structures (AMAS) (edited by Gareth Knowles), 4-8 Nov. 1991, Alexandria, Va., all of which are incorporated by reference in their entirety herein.

While tuned dampers offer improved performance over damping treatments and damping links passive dampers, a number of shortcomings have been identified. For example, tuned dampers require individual tuning to the resonance frequency and proper level of energy dissipation. This tuning process may be a complex process that involves precise structural modifications and requires skilled labor and specialized measuring equipment.

In addition, selecting an appropriate material from which to construct spring elements of tuned dampers has proven challenging. Visco-elastic elastomeric materials present one evident choice. Nevertheless, the theory of viscoelasticity teaches that in the frequency and temperature range where these materials demonstrate the necessary (close to maximum) level of damping, they also exhibit maximum variability of the elastic modulus with temperature, which makes the tuning of the damper unstable: the stiffness of the spring may change and the damper become mistuned even after moderate changes in temperature. In contrast, metals have elastic moduli which are substantially independent of temperature. Unfortunately, however, metals fail to provide the necessary damping.

Often, damping fluids or oils are used in conjunction with metal springs. FIG. 1 shows an example of a prior art tuned damping system. As shown, the tuned damper system 1 includes a casing or housing 3 formed by a sidewall 5, a base plate 7, and a cover plate 9. At least one chamber 11 is formed within the casing 3. Further, a damping mass 13 supported by or in communication with one or more elastic elements 15 is positioned within the chamber 11 of the casing 3. As shown in FIG. 1, one or more damper fluids 17 are also positioned within the casing 3.

Referring again to FIG. 1, the use of damper fluids 17 may require hermetic welding of the sidewall 5, base plate 7, and cover plate 9 in order to contain the damper fluid 17. As such, manufacturing the damper is a time consuming process and involves complicated tuning procedures. For the damper 1 to work effectively, the loss factor associated with viscous fluids 17 and elastic elements 15 supporting the damper mass 13 should be close to an optimal value. This optimal value of the loss factor may depend on the mass of the damper relative to the effective mass of the main structure. The loss factor may generally be between 0.2 and 0.4 for some optical table applications. If oil is used for damping, the resulting loss factor may be adjusted by varying the quality and quantity of oil. As such, multiple sensors such as accelerometer or geophones are often used in the process of tuning dampers incorporating oil. Typically, one sensor is installed on a relatively rigid base, another on the moving mass of the damper. Adjustments to the damping characteristics may be made by comparing the outcome of the two sensors such as accelerometers or geophones.

Methods of tuning such a damper are generally based on adjusting nominal frequency to equal a certain value. The nominal frequency $f_0$, is the frequency defined by the damper's moving mass m and stiffness, k, $$f_0 = \frac{1}{2\pi}\sqrt{\frac{k}{m}}.$$

The sources named above describe various methodologies for defining this value (tuning frequency). According to some approaches, this tuning frequency may be equal to the resonance frequency of the main structure. According to some other approaches, the tuning frequency may stay in a certain relationship to this resonance frequency depending on the effective mass ratio of the damper and the main structure. The tuning may be performed by changing either the stiffness of the element that provides the restoring force after displacement of the moving mass or mass of the moving mass of the damper. Some methodologies include subsequent optimization of a damping factor in the tuned damper. Oil may provide an essentially frequency-independent damping coefficient, c, whereas tuned damping often requires an essentially constant loss factor, η. The two quantities are related by the equation $c=2\pi f_0 m\eta$. Therefore, the damper may be generally effective when the amount and quality of oil is adjusted to the damper frequency. Lower frequencies generally require lighter oil or less oil, higher frequencies generally require more oil or heavier oil. Some known damper embodiments use several types of oil to cover a required frequency range; fine tuning of the damping factor may be achieved by adjusting the amount of oil. The damping factor in such cases may be monitored by measuring vibration transmissibility with two vibration sensors, one of which may be installed on the moving mass of the damper.

In some cases, it may be necessary to test the damper to make sure it has the required nominal frequency and internal damping before installing it into the main structure. This may be the case with an optical table where the damper may be epoxied into the table structure and disassembly after installation may be difficult or impossible without causing considerable damage. Some state-of-the art methods of measuring natural frequencies of the tuned dampers, both for manufacturing and for quality check, may be limited by standard methods of experimental modal analysis. One method may include identifying the maximum of vibration transmissibility from the base to the moving mass of the damper. That may require two sensors, one of them may have access to the moving mass, another, used as a reference, may be located on the base or housing, and source of random or swept sine vibration. Another method may be to use shock excitation and measure the frequency of resulting oscillation of the moving mass of the damper. This method may be unreliable for some damped structures. It may be desirable to replace the manufacturing and tuning procedures with more convenient ones, specifically, to eliminate messy and time-consuming operations involving oil and welding, and simplify the measurement routines. Additionally, it would be desirable to improve on precision and allow corrections to the damper settings after it had been installed to an object, such as an optical table in some cases.

Figure 1A:
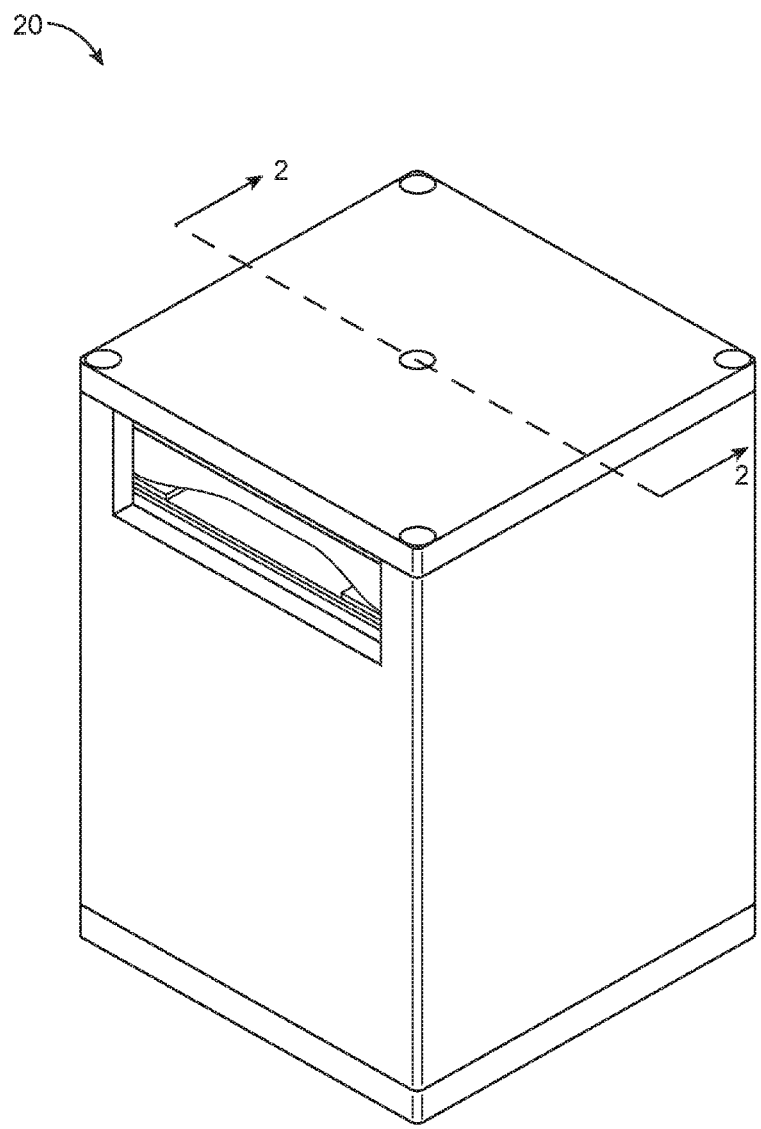
FIG. 1A illustrates a perspective view of an embodiment of a tunable damper.
Figure 2:
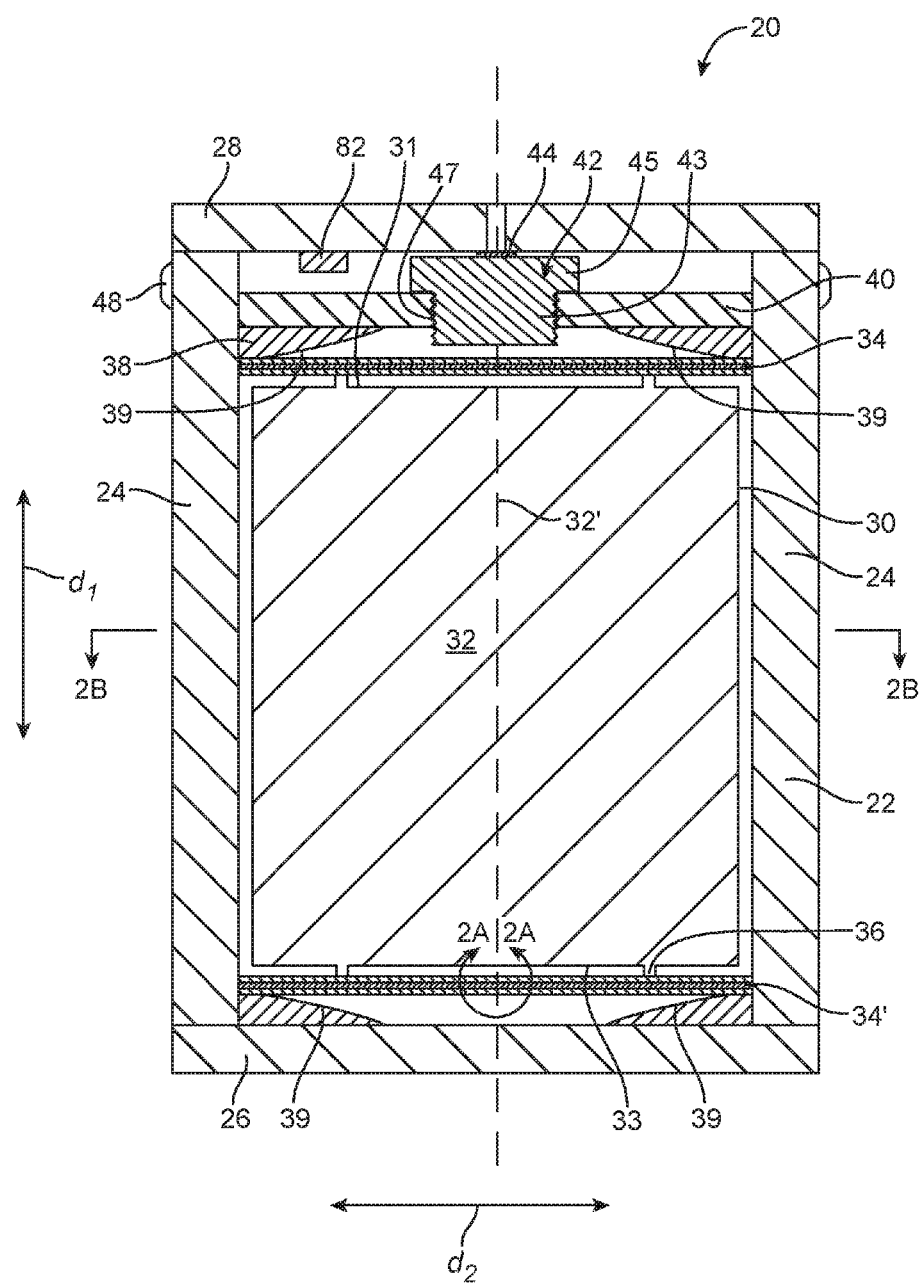
FIG. 2 illustrates a section view of the tunable damper of FIG. 1A.

FIGS. 1A and 2 show an embodiment of a tunable damper assembly 20. As shown in FIG. 2, the tunable damper assembly 20 may include a damper housing 22 which may include at least one sidewall 24 in mechanical communication with at least one base plate 26 and at least one cover plate 28. As illustrated in FIG. 2, the housing 22 may include multiple sidewalls 24. Optionally, the housing 22 may be formed from a single sidewall 24. Furthermore, the housing 22 may be formed in any number of shapes (i.e., cylindrical, rectangular) and configurations as desired. It is also contemplated that the sidewalls and plates of the housing of the tunable damper assembly 20 may generally form a frame structure that provides structural rigidity between at least one base plate 26 and at least one cover plate 28. As such, the frame or housing 22 may vary in size and shape. Furthermore, the frame 22 may be manufactured out of any number of materials including steel, iron, copper, aluminum, titanium, which may be in the form of shells, plates, rods, frames or the like.

Figure 9:
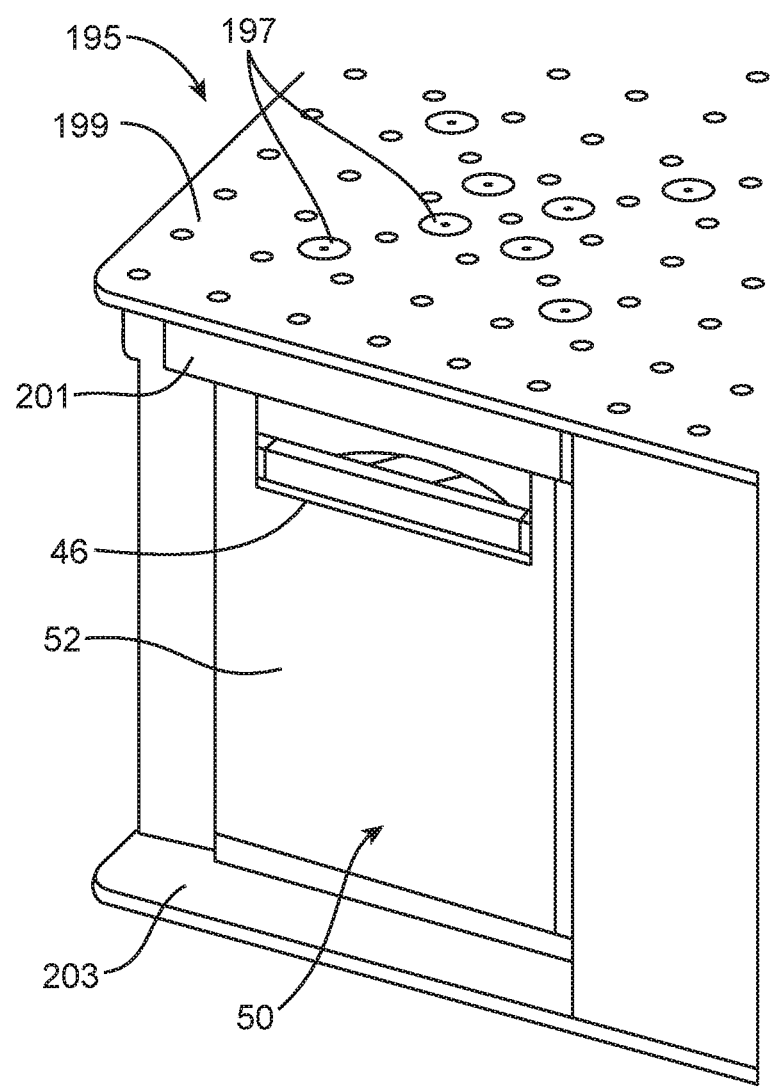
FIG. 9 is a cut away view of one corner of an optical table embodiment that illustrates the tunable damper embodiment of FIG. 3 assembled to an optical table embodiment.
Figure 9A:
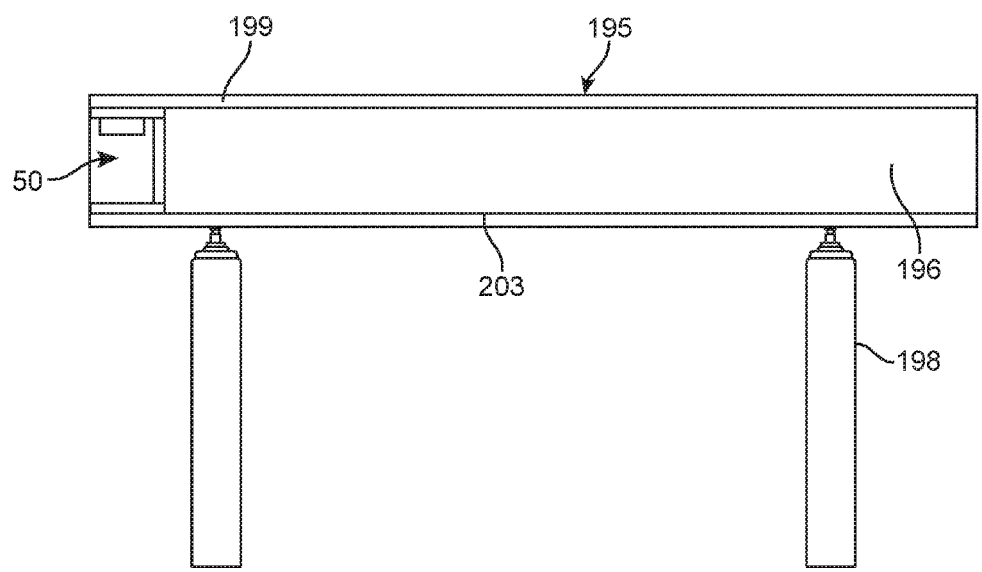
FIG. 9A is an elevation view of the optical table embodiment of FIG. 9 showing a top surface, a bottom surface, a sandwich core therebetween and supporting legs.

The tunable damper assembly 20 may be permanently or removably coupled to at least a part of an object for which the tunable damper assembly 20 is configured to damp. For example, the housing 22 (or frame) or any suitable feature of the tunable damper assembly 20, may be mechanically coupled either permanently or removably to an object (i.e., a support structure, optical table, bench, platform, breadboard, etc.) in order to damp mechanical vibrations at resonant frequencies and/or suppress forced mechanical vibrations at non-resonant frequencies (e.g., mechanical vibrations caused by unbalanced rotating equipment, etc.) affecting the object. By way of example, FIGS. 9 and 9A illustrate an embodiment of the tunable damper assembly 50 assembled to a part of an optical table 195.

As shown in FIG. 2, the sidewalls 24, base plate 26, and cover plate 28 include separate elements. As such, any number of techniques may be used to couple or secure the base plate 26 and/or cover plate 28 to the one or more sidewalls 24. For example, the base plate 26 may be welded to or brazed to the one or more sidewalls 24 while the cover plate 28 may be coupled to the one or more sidewalls 24 using one or more fasteners 48. Exemplary fasteners include, without limitations, screws, bolts, corner pieces, lock members, pins, and the like. Optionally, the base plate 26 and the cover plate 28 may be coupled to the sidewall 24 using one or more fasteners 48. By way of further example, the base plate 26 and cover plate 28 may be coupled to the one or more sidewalls 24 using any number of coupling techniques, including, without limitations, brazing, welding, adhesively bonding, compression fit, and the like. Optionally, at least one of the sidewall 24, base plate 26, and cover plate 28 may form a unitary device rather than being formed from separate elements.

Unlike some prior art damper devices, the tunable damper 20 embodiments disclosed herein do not require hermetic seals because damper fluids such as oils are not used. As such, the tunable damper assembly 20 embodiments disclosed herein may be less expensive and less time consuming to manufacture and assemble compared to some prior art systems. In addition, the tunable dampers 20 disclosed herein may also provide the advantage of being easier to tune and fine-tune due at least in part to the tunable damper's 20 lack of reliance on fluids compared to some prior art systems.

Referring again to FIG. 2, the housing 22 may include at least one chamber or vestibule 30 configured to receive at least one movable damper mass device 32 therein. Optionally, any number of chambers 30 may be formed within the housing 22. Furthermore, any one chamber 30 may be sized and shaped to allow movement or oscillation of the damper mass device at least along a first linear axis. As shown in FIG. 2, the chamber 30 includes a single damper mass device 32 positioned within the chamber 30. However, any suitable number of damper mass devices 32 may be positioned within the chamber 30. The damper mass 32 may also be disposed within the frame, and the damper mass 32 may be comprised of one or more massive bodies.

In an embodiment of the tunable damper 20, the damper mass device 32 may be movable along a first linear direction, which is illustrated by way of example in FIG. 2 as $d_1$. Direction $d_1$ may be oriented substantially parallel to a longitudinal axis 32' of the damper mass 32. Additionally, direction $d_1$ may be oriented substantially parallel to a line from the center of a first mass engaging member 34 adjacent the cover plate 28 to a center of a second mass engaging member 34 adjacent the base plate 26. Alternatively, the damper mass 32 may be movable along a second linear direction, which is illustrated by way of example in FIG. 2 as $d_2$. Direction $d_2$ may be oriented approximately perpendicular to direction $d_1$. Furthermore, some embodiments of the tunable damper assembly 20 may allow the movable damper mass 32 to move along a first and second linear direction, such as $d_1$ and $d_2$, independently and/or simultaneously in a diagonal orientation.

As shown in FIG. 2, the damper mass 32 may have a rectangular box shape including a top surface and a bottom surface. However, the damper mass 32 may have any number of sizes and shapes that may assist to damp mechanical vibrations at resonant frequencies and/or suppress forced mechanical vibrations at non-resonant frequencies (e.g., mechanical vibrations caused by unbalanced rotating equipment, etc.) affecting the object which the tunable damper assembly 20 is secured to, as will be discussed in greater detail below. In addition, the damper mass device 32 may be manufactured from any number of a variety of materials. For example, the damper mass device 32 may be made out of tungsten and/or steel. Additionally, and without limitations, the damper mass device 32 may be made out of aluminum, titanium, steel, iron, copper, various alloys, lead, fluids, magneto-reactive materials or fluids, ceramics, composite materials, silica, granite, and the like.

FIG. 2 also illustrates an embodiment of a mass engaging member 34. The mass engaging member 34 may be a resilient flexible member in the shape of a substantially flat plate with a first surface that may be substantially parallel to a second surface that is supported on at least two outer edges. The mass engaging member 34 may have sufficient resilience to support the weight of the mass device 32 but sufficient flexibility or mechanical compliance in response to the pressure from the loading device 42 to deflect the mass engaging member 34. The mass engaging member 34 may be made of at least one flexible and resilient material and may be configured to generally provide a flexible resilient support for the damper mass 32 so as to allow the damper mass 32 to oscillate and assist in damping resonance or non-resonance vibrations. For example, the damper mass 32 may be positioned between one or more mass engaging members 34 where the at least one mass engaging member 34 enables the damper mass 32 to move relative to resonant and non-resonant vibrations present in the object to which the tunable damper 20 is coupled to. For example, one or more mass engaging members 34 may be operatively coupled to the damper mass 32 such that when at least one mass engaging member 34 flexes or deforms during or as a result of displacement of mass 32 it allows the damper mass 32 to move along a linear direction or axis, such as $d_1$.

For the embodiment shown in FIG. 2, the damper mass 32 is disposed between and supported by a first mass engaging member 34 and a second mass engaging member 34'. Furthermore, the damper mass 32 may be secured (e.g., screwed, adhered, etc.) to the first mass engaging member 34 and second mass engaging member 34'. During assembly, for example, the damper mass 32 may be secured to the first and second mass engaging members 34 and 34' such that the longitudinal axis 32' of the damper mass 32 is aligned generally with the center of the first and second mass engaging members 34 and 34'. In general, this configuration generally allows the damper mass 32 to move or oscillate along its longitudinal axis 32' or the first linear direction $d_1$ upon flexion or deformation of one or both of the mass engaging members 34. In particular, for the embodiment shown in FIG. 2, as the damper mass 32 is displaced along $d_1$ in an upward direction from a nominal or resting position, the upper mass engaging member 34 is bowed or deflected to a greater extent and generates a non-restoring force in a downward direction. In addition, as the mass 32 is displaced upward from the nominal or resting position, the lower or second mass engaging member 34' may become less deformed from a flat or resting shape and configuration so as to provide less force on the mass 32 in the upward direction.

This results in a net increasing downward restorative force on the mass 32 as the upward displacement of the mass increases. Eventually, this downward restorative force from the mass engaging member or members 34 will cause the mass 32 to stop its upward movement and begin moving in a downward direction under at least the restorative force of the upper mass engaging member 34. The reverse of this process is then repeated as the mass is displaced in a downward direction from the nominal or resting position of the mass 32 so as to allow the mass 32 to oscillate between the two mass engaging members 34 and 34' during use. Furthermore, the damper mass 32 and the first and second mass engaging members 34 and 34' may be assembled such that they are generally centered within the chamber 30 of the housing 22. The ability of a mass engaging member 34 to flex or deform may be affected by features interacting with the mass engaging member 34 and/or due to material or structural properties of the mass engaging member 34.

Figure 2A:
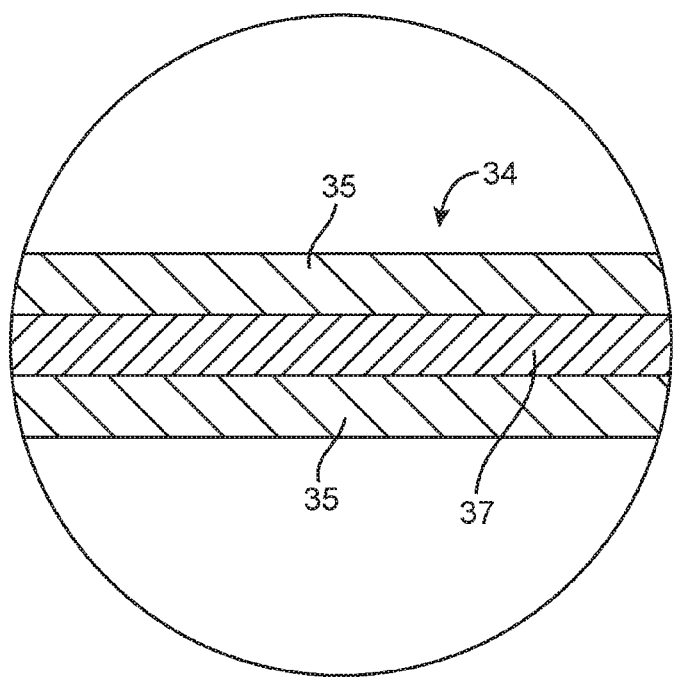
FIG. 2A illustrates an enlarged view in partial section of the mass engaging member of FIG. 2.
Figure 2B:
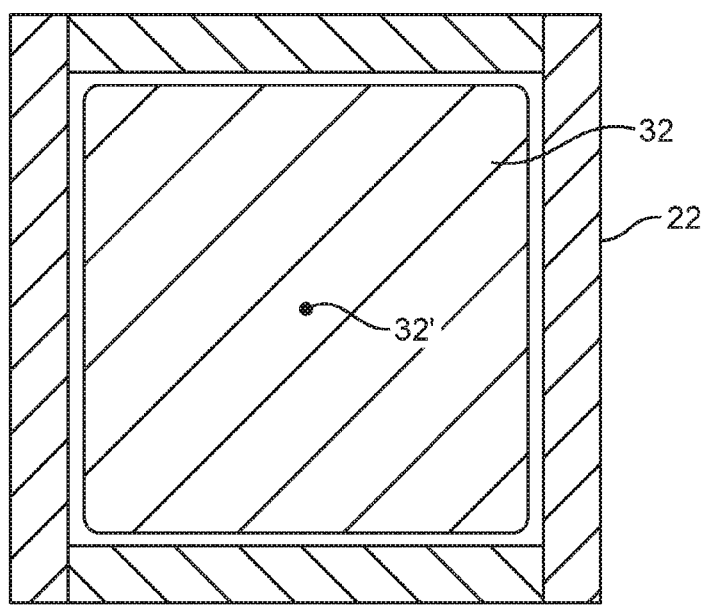
FIG. 2B is a transverse section of the tunable damper of FIG. 2.

In some embodiments, the mass engaging member 34 may include an elastic member such as a leaf spring or plate having similar elastic support with a generally symmetrical overall shape with two sets of opposing parallel sides. The mass engaging member 34 may include a multiple layer laminate device formed from one or more outer layers 35 sandwiching one or more inner layers 37, as shown in FIGS. 2 and 2A. Exemplary resilient materials having spring-like properties for forming the outer layers 35 may include, without limitations, steel, titanium, high-strength polymers, spring metal, and the like. Inner layer embodiments 37 may be formed from highly damped viscoelastic elastomers such as polyurethane, sorbothane, silicon rubber, natural rubber, and the like. In addition, the inner layer embodiments 37 may have a variety of hardness properties, such as about 55 Shore A hardness to about 75 Shore A hardness. The mass engaging member 34 may include materials that assist in absorbing and dissipating vibrational energy, for example, upon movement of the damper mass 32. The absorption and dissipation of this energy ultimately assists in damping at least some of the resonance modes of an object to which the damper 20 is attached.

In some cases, at least one engaging device 36 may be positioned between and in contact with at least one surface of the mass engaging member 34 and damper mass 32. The at least one engaging device 36 may function to affect the flexing of the mass engaging member 34 and effective distance the damper mass 32 may travel. For example, an engaging device 36 may function at least in part to provide support along a resilient part of the mass engaging member 34 so that when the damper mass 32 moves or oscillates, such as in the general direction $d_1$, the mass engaging member 34 flexes or bows, or otherwise deforms. Furthermore, features and positioning of the engaging devices 36 may affect the flexing or bowing of the mass engaging member 34, which ultimately may affect the ability of the tunable damper 20 to damp vibration in certain ranges of resonance frequencies. The four engaging devices 36 shown in FIG. 2 include elongate ridges or bodies extending across the end surfaces of the damper mass 32 in a direction which is substantially perpendicular to $d_1$ and $d_2$, however, other configurations are also contemplated.

In some cases, engaging device 36 may function similar to a fulcrum such that the placement of the engaging device 36 relative to the area of resilient material of the mass engaging member 34 may affect the mechanical compliance of the mass engaging member 34. For instance, a single engaging device 36 oriented generally at or along a center or centerline, respectively, of the resilient material of the mass engaging member 34 may result in the greatest mechanical compliance or the least amount of force necessary to be applied by the engaging device 36 in order to cause the mass engaging member 34 to flex or deform. More than one engaging device 36 may engage a single mass engaging member 34 (as shown in FIG. 2) in order to provide, for example, additional stability compared to a single engaging device 36. As such, more than one fulcrum may interact with a single mass engaging member 34, which may result in a variety of mechanical stiffness and compliance of the mass engaging member 34 depending on the shape and placement of the one or more engaging devices 36.

Figure 6:
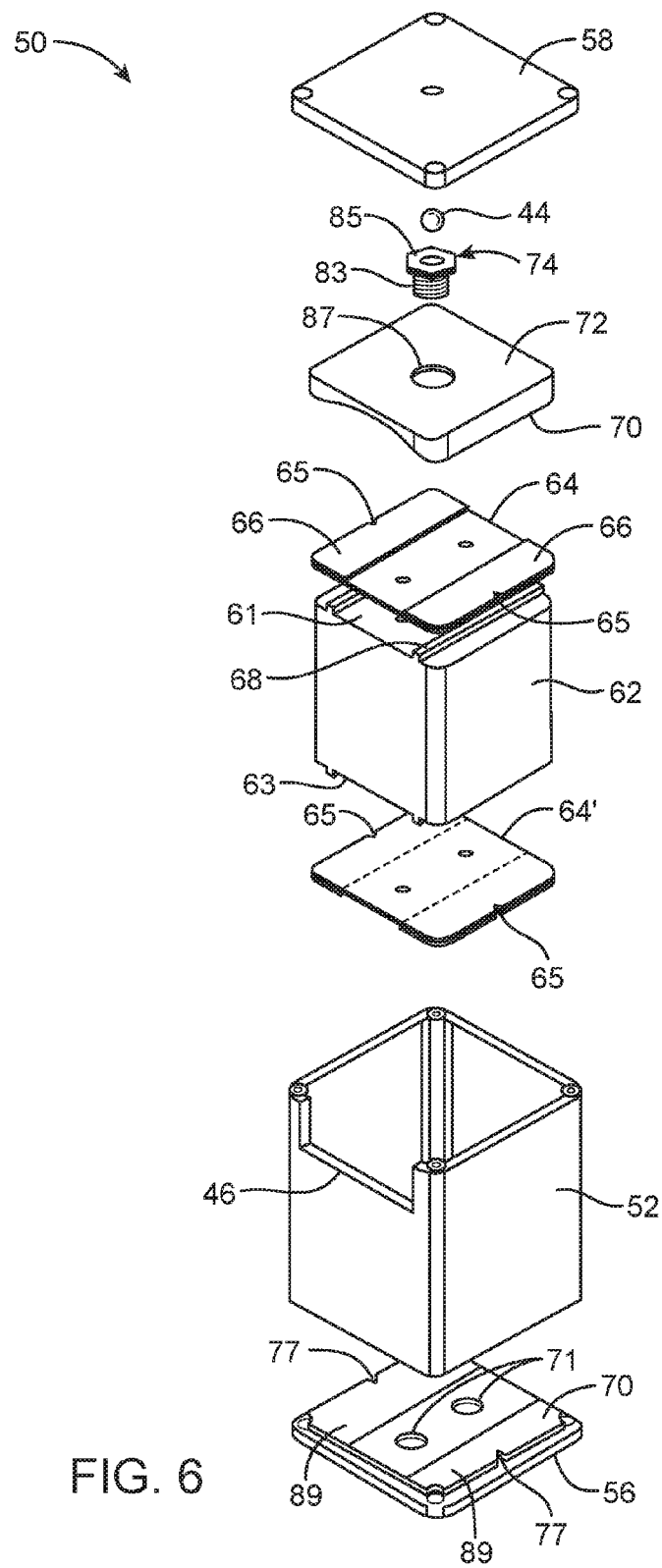
FIG. 6 illustrates an exploded view of the tunable damper of FIG. 3.

The engaging devices 36 shown in FIGS. 2 and 6 include elongate bodies of substantially constant transverse dimension. Longitudinal axes of the elongate bodies lie substantially parallel to each other and substantially perpendicular to directions $d_1$ and $d_2$, as discussed above. In some cases, the engaging devices 36 may extend across the entire width of the damper mass 32 and may have a transverse dimension of about 0.05 inches to about 0.20 inches. In general, the engaging members 36, such as the elongate bodies, are generally disposed symmetrically relative to a centerline of the mass engaging member 34. For the embodiment shown in FIG. 2, the centerlines of the mass engaging members 34 and 34' intersect the axis 32' of the damper mass 32. As the pair of elongate bodies are positioned at a greater distance relative to each other, the effective length of resilient material of the mass engaging member 34 is decreased which results in a lower mechanical compliance due to an increase in the amount of force required to cause the mass engaging member 34 to flex or bow. Similarly, as the pair of elongate bodies are positioned closer together or towards the centerline of the mass engaging member 34 in some cases, the effective length of resilient material of the mass engaging member 34 is increased which results in a greater mechanical compliance due to the decrease in amount of force required to cause the mass engaging member 34 to flex or bow.

In general, engaging device 36 configurations that result in generally less compliant mass engaging members 34 may be more appropriate for use in tunable dampers 20 that are to be used to damp resonance vibrations in higher frequency ranges, e.g. above 100 Hz. Furthermore, engaging device 36 configurations that result in generally more flexible (greater mechanical compliance) mass engaging members 34 may be more appropriate for use in tunable dampers 20 that are to be used to damp resonance vibrations in lower frequency ranges, e.g. below 100 Hz. However, more and less flexible mass engaging members 34, such as leaf springs having different thickness may be used in tunable dampers 20 configured to damp higher and lower resonance frequencies, respectfully, in some instances. Additional factors such as material properties of the mass engaging member 34 and surface features of the engaging device 36 may also assist in affecting the extent to which the mass engaging member 34 can flex or deform during oscillation of mass 32, as will be discussed in greater detail below. Furthermore, an engaging device 36 may have any number of shapes, sizes and surface features which assist in the damping function of the tunable damper assembly 20. As discussed above, the tunable damper 20 may be used to reduce resonant and non-resonant vibrations.

At least one engaging member support 38 is configured to engage and support at least a portion of the adjacent mass engaging member 34. In general, one or more features of the engaging member support 38 functions to provide support along at least a part of opposing ends of a mass engaging member 34. More specifically, the engaging member support 38 provides support to an adjacent mass engaging member 34 while still allowing the mass engaging member 34 to flex or deform. In addition, the engaging member supports 38 may have a sloped surface 39 with a profile or shape that is configured such that an increase in an applied force or preload from the engaging member supports 38 to the mass engaging member 34 may result in an increase in contact surface area between the mass engaging member 34 and engaging member support 38. In general, the greater the contact surface between the engaging member support 38 and the mass engaging member 34, the greater the effective stiffness of the mass engaging member 34 and the shorter the distance the damper mass 32 may be able move in response to a given force on the mass 32.

Figure 3:
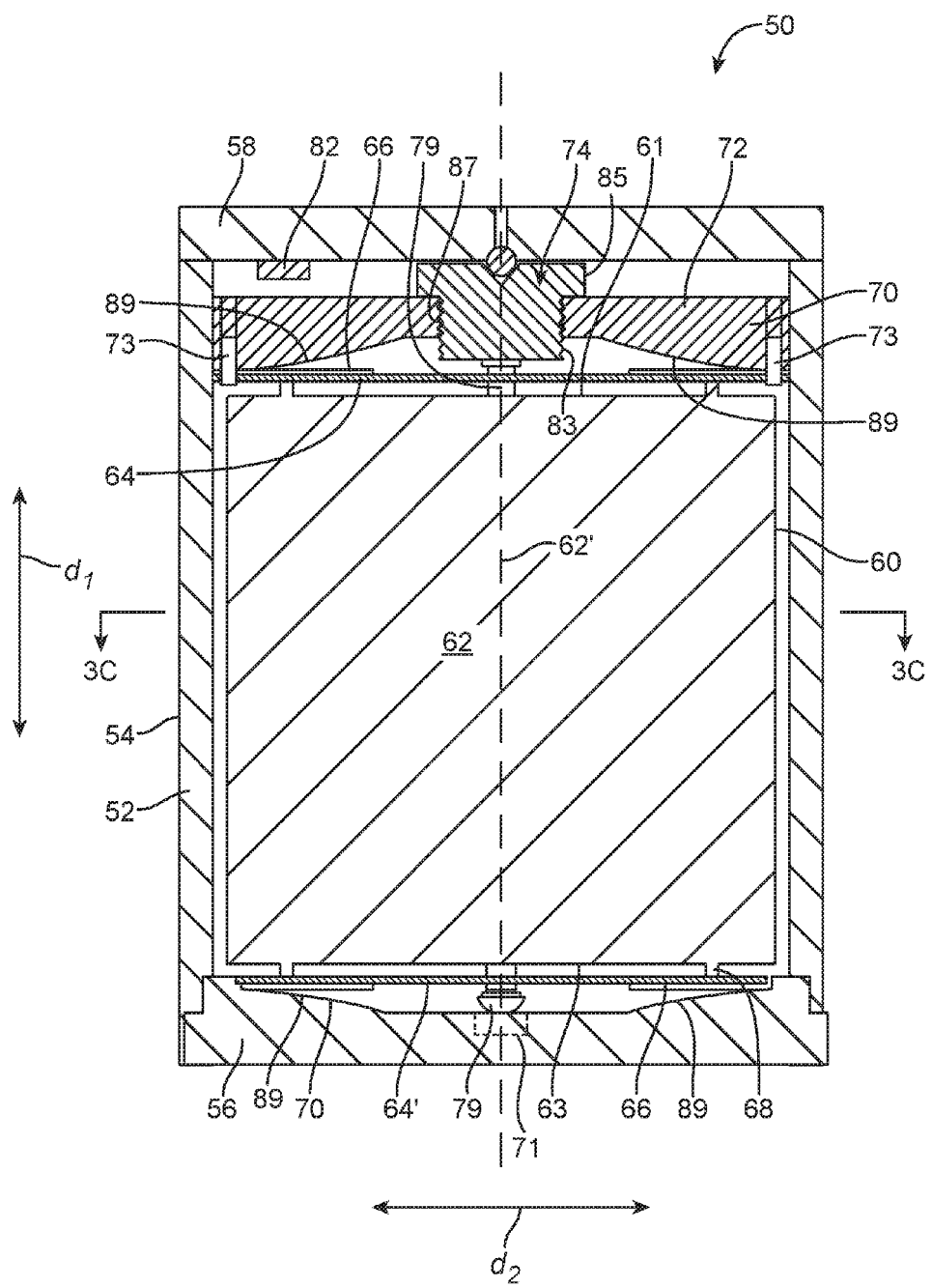
FIG. 3 illustrates a section view of an embodiment of a tunable damper showing mass engaging members operatively coupled to highly damped elements.

The engaging member support 38, or any other similar structure of embodiments discussed herein such as supports 70 shown in FIG. 3, may include a sloped surface or a curved profile 39. In general, any number of smooth profiles of the engaging member support 38 may produce a change in contact area between the engaging member support 38 and the adjacent mass engaging member 34. The curved profiles 39 of the engaging member supports 38 and 70 may be chosen, within certain geometric constraints, to ensure smooth change in the effective stiffness or mechanical compliance of the mass engaging members 34 and 64 as a result of the movement or displacement of the loading device 42 and 74 (see also FIG. 3) in the process of tuning the resonant frequency of the tunable damper assembly. In some embodiments, such as the tunable damper embodiments 20 and 50 of FIGS. 2 and 3 respectively, which use leaf type springs as elastic mass engaging members 34 and 64, good results were achieved by employing engaging member support 38 curved profiles 39 having a substantially circular configuration with radiuses commensurate with the size of the mass engaging member 34 and 64 plates, e.g., about 4 inches to about 5 inches in some cases. Generally, the shape of the engaging member support 38 curved profiles 39 may be determined by modeling the engaging member supports restrained by supports under loads exerted by the load mechanisms 42 and 74, using the methods known in the art. Curved profiles 39 other than circular, e.g. linear, parabolic, and others may also prove useful for some embodiments.

In general, the engaging member supports 38 may be substantially rigid in order to provide the necessary support for the mass engaging member 34. Alternatively the engaging member supports 38 may include a generally compliant material. By way of example, the engaging member supports 38 may be manufactured out of steel, aluminum, plastic, glass, or ceramics. The engaging member supports 38 shown are positioned at opposing ends of a mass engaging member 34 and extend across the entire width of the mass engaging member 34 to provide support along an entire edge thereof.

At least one load plate member 40 may be positioned adjacent the engaging member supports 38. In the illustrated embodiment, the load plate member 40 is positioned generally between the cover plate 28 and the engaging member supports 38. Optionally, the load plate member 40 may be positioned proximate to the base plate 26. In some embodiments, the load plate members 40 may be positioned proximate to the base plate 26 and the cover plate 28. In addition, the load plate member 40 and engaging member support 38 may be combined into a single part. Also, two or more of a load plate member 40, cover plate 28, base plate 26 and/or engaging member supports 38 may be combined to form a single part. The load plate 40 may be displaceable relative to the housing to provide a stable but adjustable support surface for the engaging member support 38. In some cases, the adjustment of the load plate 40 may include displacement of the load plate 40 made along $d_1$. The load plate member 40 may be manufactured from any variety of materials, including, without limitations, aluminum, titanium, steel, polymers, ceramic, and the like.

Referring again to FIG. 2, at least one load mechanism 42 may be operatively coupled to the load plate member 40 and may be configured to controllably apply at least one biasing force to or displacement of the load plate member 40 relative to the cover plate 28. The load mechanism 42 may include a screw configuration having an elongated threaded member 43 extending from a hexagonal head 45. The threads extending from the threaded member 43 may engage recessed threads of a threaded through hole 47 extending through the load plate 40 generally at a center point of the load plate 40. This threaded engagement between the threaded member 43 of the load mechanism 42 and the threaded through hole 47 of the load plate 40 allow the load plate 40 to move as a result of rotation of the load mechanism 42. For instance, rotation of the load mechanism 42 in a first direction may result in moving the load plate 40 in the direction of the damper mass 32. In general, when the load plate 40 moves in the direction of the damper mass 32, the force generated by the load plate 40 against the mass engaging members 34 may increase. The force may be transmitted through profiled engaging member supports 38 to the engaging members 34 (damped springs), thereby changing contact and support areas of those members. As such, the effective stiffness and the resonance frequency of the damper mass 32 are also affected by the force transmitted through the profiled engagement member supports 38, which may thereby achieve the desired effect of tuning.

Figure 7:
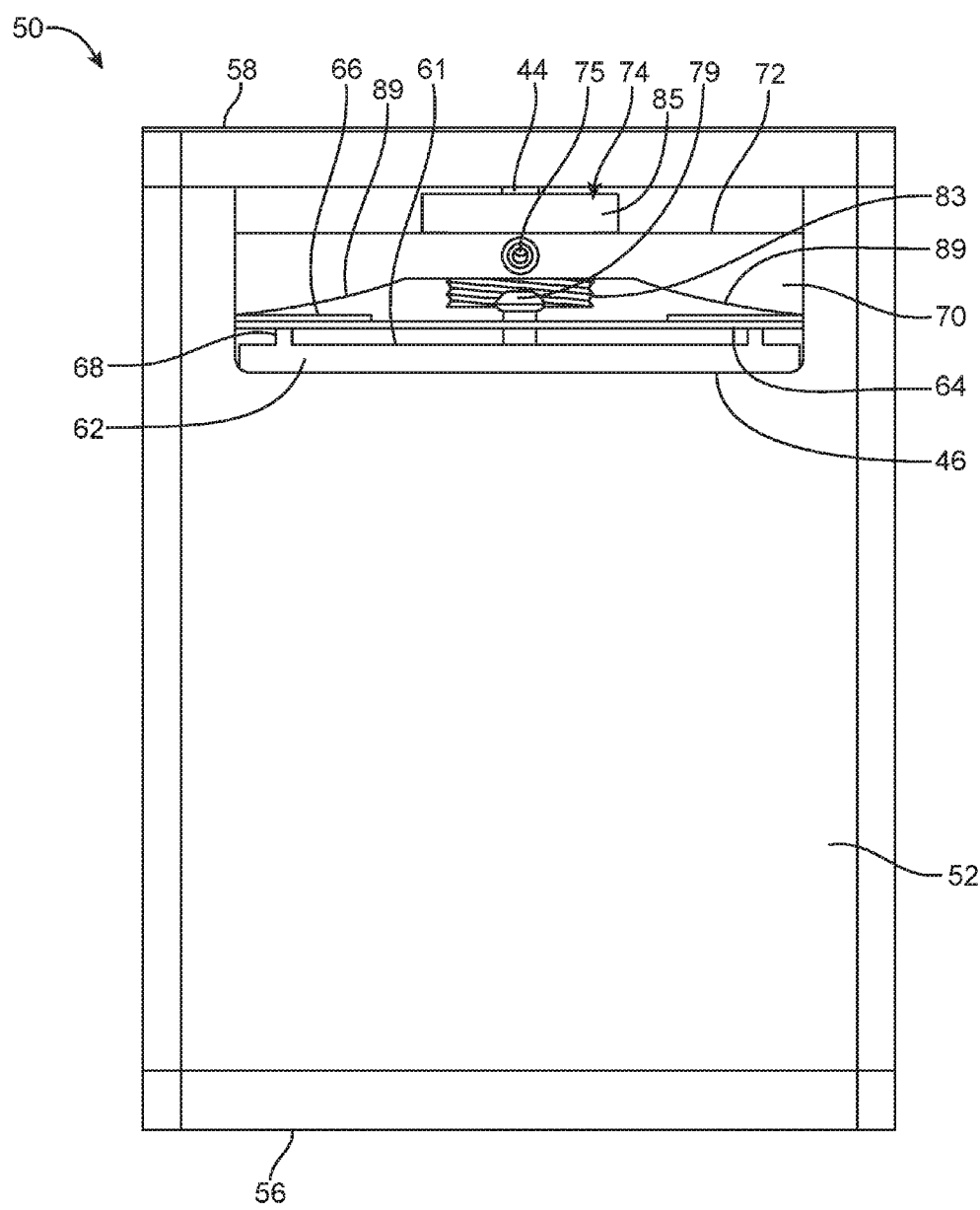
FIG. 7 illustrates a front elevation view of the tunable damper of FIG. 3.

In the illustrated embodiment, the load mechanism 42 is accessible and adjustable by a user via at least one access port 46 (see example access port in FIGS. 6 and 7). In general, the threaded member 43 of the load mechanism 42 may engage threaded features of the threaded through hole 47 of the load plate 40 such that, for example, when the threaded member 43 of the load mechanism 42 is rotated relative to the load plate 40, the biasing force applied by load plate 40 to the engaging member supports 38 along direction $d_1$ may be increased or decreased. In the embodiment shown, the load mechanism 42 is configured to increase or decrease force on the load plate 40 along direction $d_1$.

It is contemplated that the load plate member 40 and load mechanism 42 may be positioned adjacent to the base plate 26, cover plate 28, or both. As such, the housing 22 may include one or more access ports 46. In some embodiments, the access port 46 may provide a user with the ability to interact with the load mechanism 42. For example, a user may access the load mechanism 42 by way of an access port 46 in order to adjust the biasing force applied to the load plate 40. Alternatively, adjustment of the load mechanism 42 may be done electronically with a motor (not shown) such that direct user access to the load mechanism 42 for adjustment purposes may not be necessary. Furthermore, any number of alternate mechanisms, including various alternative load mechanism embodiments that function to provide an adjustable biased force against the load plate 40 may also be used.

At least one load interface 44 may be positioned between the cover plate 28 the load plate 40 and/or load mechanism 42 and may be configured to reduce friction between the load mechanism 42 and any surrounding features such as the cover plate 28. In some embodiments, the load interface 44 includes a ball bearing (as shown in FIG. 3). However, any number of different devices may be used as a load interface 44, such as a flat washer, or the like.

FIGS. 3-7 show another embodiment of a tunable damper assembly 50. As with previously described damper embodiments, the tunable damper assembly 50 includes a damper housing 52 formed from at least one sidewall 54 secured to at least one base plate 56 and at least one cover plate 58. In addition, the tunable damper assembly 50 includes a damper mass 62 positioned within a chamber 60 of the housing 52 with a first mass engaging member 64 positioned adjacent to the top surface 61 of the damper mass 62 and a second mass engaging member 64' positioned adjacent to a bottom surface 63 of the damper mass 62. The tunable damper assembly 50 may have some or all of the same or similar features, functions dimensions or materials as described in the tunable damper 20 above, and any suitable feature or function of the previous tunable damper 20 embodiment may be incorporated into any tunable damper embodiment 50 disclosed herein.

Figure 3A:
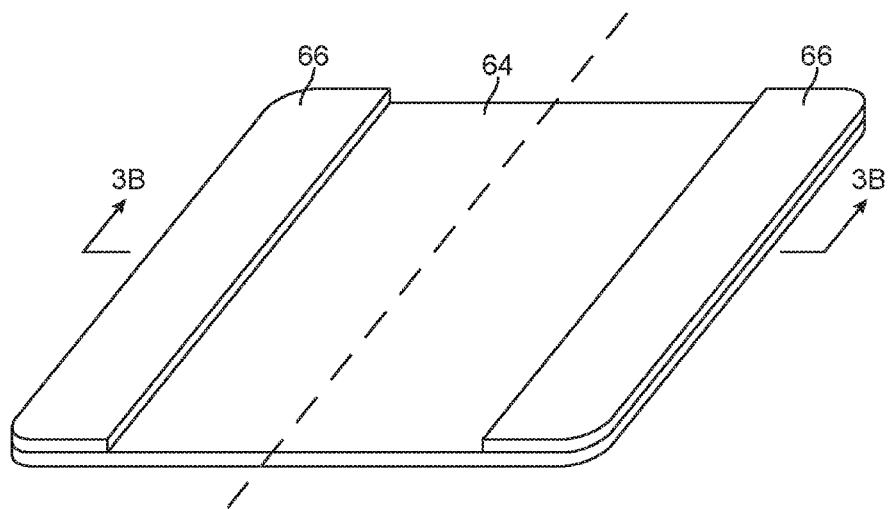
FIG. 3A illustrates a perspective view of an embodiment of a mass engaging member.
Figure 3B:
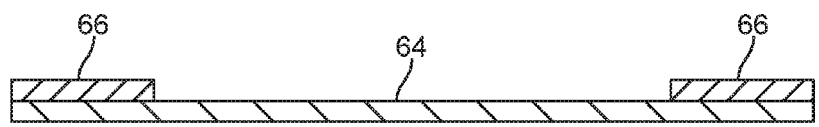
FIG. 3B illustrates a section view of the mass engaging member of FIG. 3A.
Figure 3C:
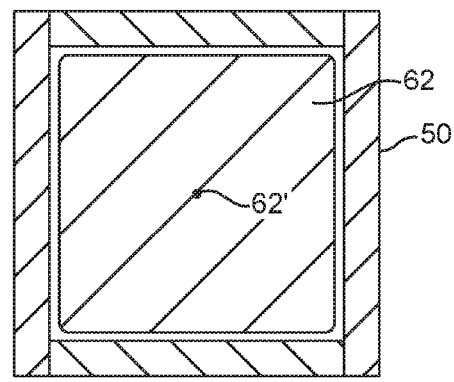
FIG. 3C is a transverse section of the tunable damper of FIG. 3.

Tunable damper 50 includes mass engaging members 64 supported at least partially by one or more highly damped elements or supports 66. The highly damped elements 66 may generally incorporate one or more layers of thin viscoelastic elastomers, such as polyurethanes, and/or silicon materials disposed along at least one surface of the mass engaging members 64. As shown in FIGS. 3A and 3B, a mass engaging member embodiment 64 may include one or more flat sheets of resilient flexible material having generally opposing parallel sides and opposing parallel surfaces. One or more highly damped elements 66 may be secured to opposing sides of a first surface of the mass engaging member 64. The highly damped element 66 may include thin flat layers of viscoelastic material in the form of a sheet or pad. Any variety of other highly damped materials may be used to form the highly damped elements 66 such as polyurethane, silicon rubber, natural rubber, etc. These materials may have a variety of hardness properties, such as about 55 Shore A hardness to about 75 Shore A hardness. Additionally, the highly damped element 66 may have a thickness of about 0.01 inch to about 0.1 inch. For example, the highly damped element 66 may have a thickness of about 0.02 inches to about 0.04 inches in some embodiments. By way of further example, and as illustrated in FIG. 3, the mass engaging members 64 may be operatively coupled to highly damped elements 66 along at least a part of opposing sides of a first surface of the mass engaging members 64. Additionally, the highly damped elements 66 may be positioned between engaging member supports 70 and mass engaging members 64.

The compression force experienced by the highly damped elements 66 may be at least partially due to the biased force along direction $d_1$ parallel to a longitudinal axis 62' of mass 62 applied by the load mechanism 74 and load plate 72, as described above by way of example. The force may be transmitted through curved profile 89 surfaces of the engaging member supports 70 to the engaging members 64 (damped springs), thereby changing contact and support areas of those members. Therefore the effective stiffness of the engaging members 64 and the resonance frequency of the damper mass 62 oscillations between the members 64 are also affected by the force transmitted through the curved profiles 89 of the engagement member supports 70, which may thereby achieve the desired effect of tuning. This biased force may also enable the curved profiles 89 of the engaging member supports 38 to exert a biased force upon a first contact area 67 (shown by way of example in FIGS. 4A/B and 5) of the highly damped elements 66. A second contact area 69 of the highly damped elements 66 may be generally in contact with the mass engaging member 64 which is at least supported by engaging devices 68 and provides an opposing compression force to the highly damped elements 66.

In the illustrated embodiment, the load mechanism 74 is accessible and adjustable by a user via at least one access port 46 (see example access port in FIGS. 6 and 7). In general, a threaded member 83 of the load mechanism 74 may engage threaded features of the threaded through hole 87 of the load plate 72 such that, for example, when the threaded member 83 of the load mechanism 74 is rotated relative to the load plate 72, the biasing force applied by load plate 72 to the engaging member supports 70 along direction $d_1$ may be increased or decreased. In the embodiment shown, the load mechanism 74 is configured to increase or decrease force on the load plate 72 along direction $d_1$.

Figure 4A:
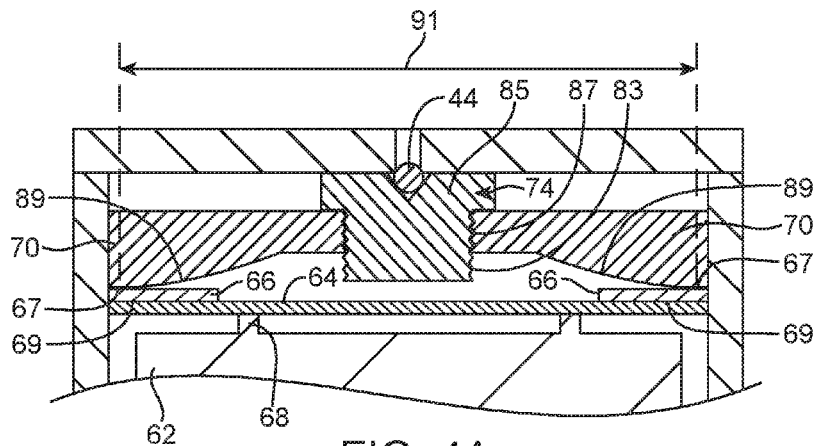
FIG. 4A illustrates a partial view of the tunable damper embodiment of FIG. 3 showing the highly damped elements supported between the mass engaging member and engaging member supports.
Figure 4B:
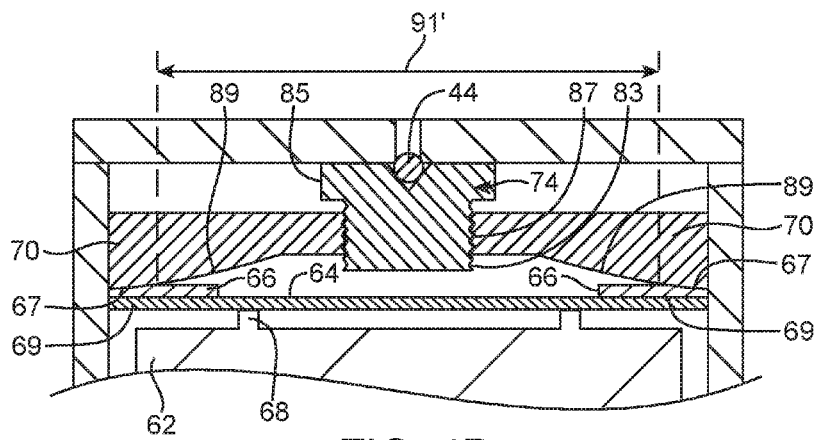
FIG. 4B illustrates a partial view of the tunable damper of FIG. 3 showing the highly damped elements in a compressed state.
Figure 5:
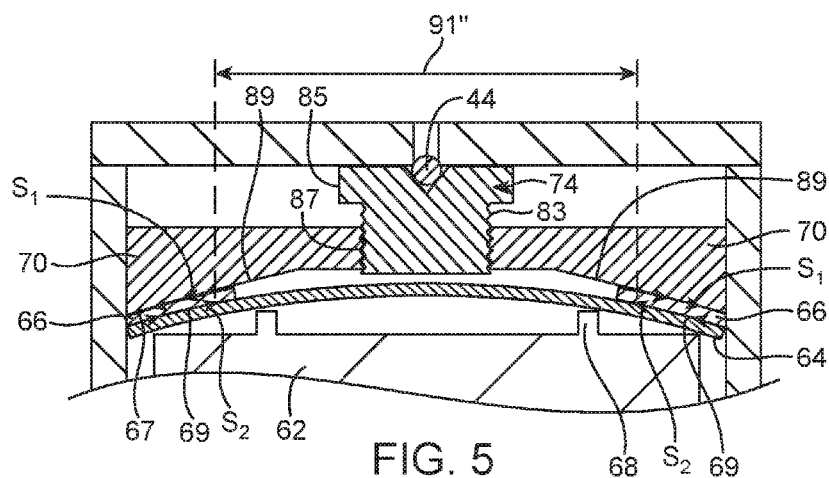
FIG. 5 illustrates a partial view of the tunable damper of FIG. 3 showing the highly damped elements experiencing shear deformation upon bending or flexing of the mass engaging member.

FIGS. 4A through 5 also show how an increase in the first contact area 67 may result in a shorter effective compliant length of the mass engaging member 64 which may flex or bow in response to movement of the damper mass 62. In general, as the first contact area increases 67, the effective compliant length of the mass engaging member 64 decreases which results in a less mechanically compliant mass engaging member 64. Therefore, FIG. 4A shows the smallest first contact area 67 with the longest effective compliant length 91. The first contact area 67 in FIG. 4B is greater than the first contact area 67 in FIG. 4A and also has a shorter effective compliant length 91' than the compliant length 91. FIG. 5 shows the mass engaging member 64 flexing or bowing and having an even greater first contact area 67 and an effective compliant length 91" even shorter than compliant length 91'.

Any one highly damped element 66 may be generally secured in place by way of bonding, adhering or molding of the highly damped elements 66 to a surface, such as to the mass engaging member 64. By way of example, any one highly damped elements 66 may be bonded to a surface (i.e., mass engaging member 64, engaging member supports 70) using, without limitations, urethane glue, epoxy, and the like. In some embodiments of the mass engaging member 64, at least a part of the mass engaging member 64 may be laminated, coated over molded with a viscoelastic material to form a highly damped element 66 thereon. For example, the mass engaging member 64 may be laminated with a viscoelastic polymer, polyurethane, silicon rubber, or any damping material that can form a highly damped element 66 and assist in the damping of resonance vibrations.

The highly damped elements 66 generally function to absorb and dissipate energy resulting from the resonance vibrations present in the object to which the tunable damper assembly 50 is operatively coupled. More specifically, for the embodiment shown, as the damper mass 62 moves or oscillates within the housing and causes one or more mass engaging members 64 to flex or deform, the highly damped elements 66 may experience shear deformation as shown by arrows $S_1$ and $S_2$ in FIG. 5. This shear deformation experienced by the highly damped elements 66 may be at least partially due to the adhesion or frictional forces acting along the first contact area 67 and second contact area 69. These adhesion or frictional forces result in generally opposing directional movements, or shear deformation, between material layers of the highly damped elements 66 when the mass engaging member 64 deforms or flexes. Shear deformation of the material of the highly damped supports may allow the energy resulting from resonance vibrations to dissipate in the material body of the highly damped elements 66, which may damp the resonance vibrations in the object to which the tunable damper 50 is operatively coupled to.

FIGS. 4A through 5 are schematic views of a portion of the tunable damper 50 illustrating the highly damped element 66 compressed between the engaging member support 70 and mass engaging member 64. In particular, FIG. 4A illustrates the mass engaging member 64 in a first position. When the mass engaging member 64 is in this first position, the mass engaging member 64 is not substantially flexed or deformed and is generally in a flat configuration. FIG. 5 illustrates the mass engaging member 64 in a flexed or bowed position. Movement of the damper mass 62 and/or engaging member support 70 towards each other generally causes the mass engaging member 64 to be in a flexed or bowed position.

In the first position, shown in FIG. 4A, the highly damped element 66 is in contact with the engaging member support 70, but the contact area 67 between the highly damped element 66 and the engaging member support 70 is relatively small. However, when the mass engaging member 64 is in the flexed position, as shown in FIG. 5, the contact area 67 between the highly damped element 66 and the engaging member support 70 may be significant.

During use of the tunable damper assembly 50, in some cases the damper mass 62 may vibrate or oscillate within the housing primarily along direction $d_1$ in response to vibrations present in an object that the tunable damper 50 is operatively coupled to. In most cases, the vibrations in the object are transmitted from the object, through the housing, the supports 70 and members 64 to the mass 62. Movement of the damper mass 62 generally causes the mass engaging members 64 to bend or flex. When a mass engaging member 64 is in a flexed position, the highly damped element 66 may be in surface contact with the flexed mass engaging member 64. During oscillatory motion of the damper mass 62, and the resulting flexural deformation of mass engaging members 64, material layers between the first and second contact surfaces 67 and 69 experience dynamic deformation due to the adhesion or frictional forces pulling the first and second contact surfaces 67 and 69 in generally opposing directions (shown as directions S₁ and S₂ in FIG. 5).

As a result, the tunable damper 50 may be able to over time, to generally-damp mechanical vibrations at resonant frequencies and/or suppress forced mechanical vibrations at non-resonant frequencies affecting the object to which the tunable damper 50 is secured to by way of the process described above. In some embodiments of the tunable damper 50, the frequency range of vibration that the tunable damper 50 can effectively damp may be defined at least in part by the mechanical compliance, or effective flexibility, of the mass engaging member embodiments 64. As described above, a number of factors may affect the effective flexibility or compliance of the mass engaging member 64. For example, the size, shape and material properties of the mass engaging member 64 may affect the effective flexibility of the mass engaging member 64. Additionally, the features and placement of the one or more engaging devices 68 relative to the mass engaging member 64 and damper mass 62 may affect the effective flexibility of the mass engaging member 64.

Figure 8:
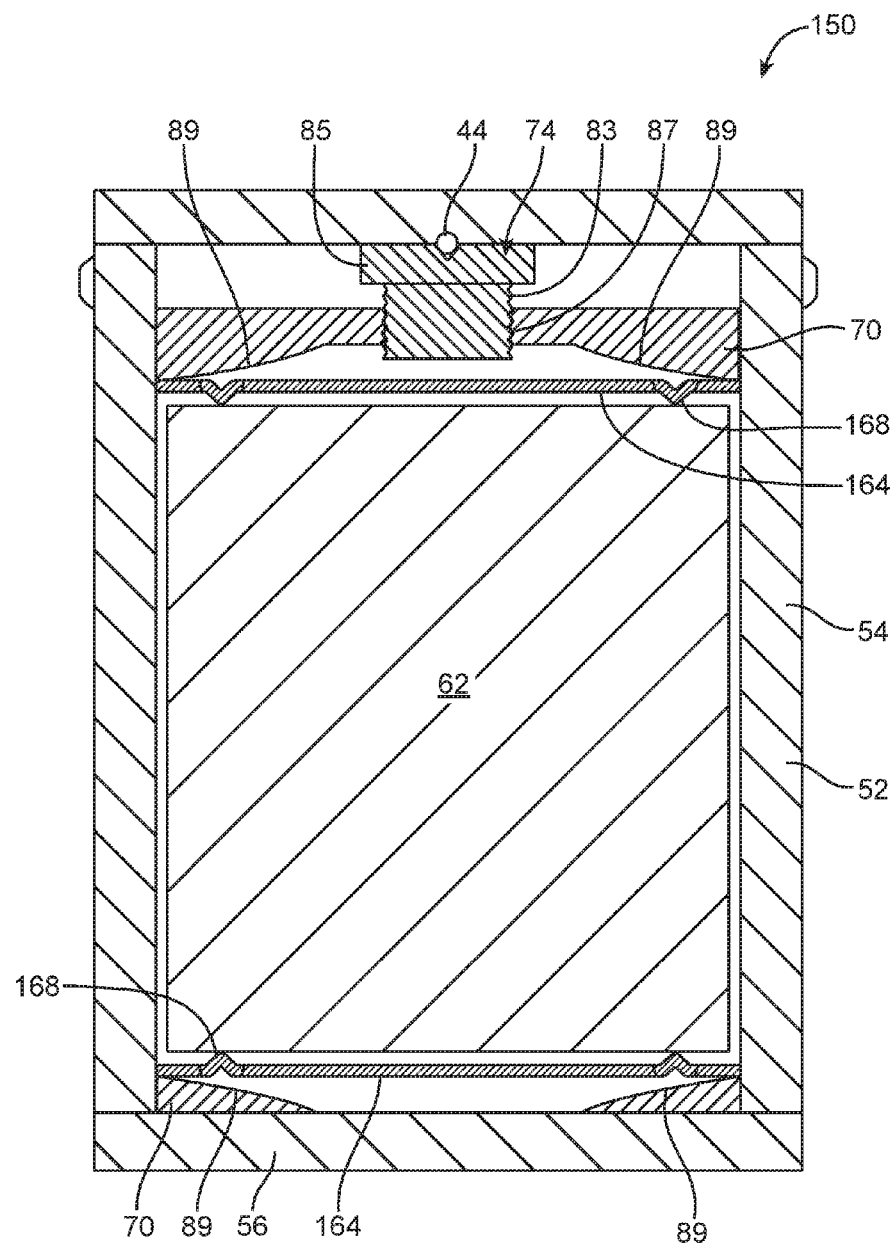
FIG. 8 illustrates an elevation view in section view of an embodiment of a tunable damper showing mass engaging members including integrally formed engaging devices.

By way of example, FIG. 8 illustrates another embodiment of a tunable damper 150 including a mass engaging member 164 having engaging device features 168. In this embodiment, the engaging device features 168 may perform the same or similar functions as the engaging devices 36 and 68 described above by providing a support or point of contact for the mass engaging member 164 with damper mass 62, and which also assist the mass engaging members 164 to flex or deform upon movement of the damper mass 62. The tunable damper assembly 150 may have some or all of the same or similar features, functions, dimensions or materials as described in tunable dampers 20 and 50 above, and any suitable feature or function of the previous tunable damper embodiments 20 and 50 may be incorporated into any tunable damper embodiment 150 disclosed herein.

As shown in FIG. 8, the engaging device features 168 may include integral bends or folds in the mass engaging member 164 material which form a pair of elongate ridges which extend substantially parallel to each other along a length of the mass engaging device 164 and project from a nominal surface of the mass engaging device 164 towards the damper mass 62. However, any number of features may be incorporated into the mass engaging member 164 which provide support for the mass engaging member 164 and assist the mass engaging member 164 in the ability to flex or deform. The mass engaging member 164 may include a viscoelastic material that is positioned between the mass engaging member 164 and one or more engaging member supports 70 for assisting in damping the resonance and/or mechanical vibrations present in an object to which the tunable damper 150 is attached. Alternatively, the viscoelastic material may be a laminate surrounding all or part of the mass engaging member 164, or part of the laminated structure of the mass engaging member 164 as shown in FIG. 2 with reference to the engaging member 34.

The size, shape and material properties of the mass engaging member may also affects its effective compliance or flexibility. FIG. 6 illustrates an exploded view of the tunable damper 50, which shows another view of the mass engaging member 64. The mass engaging member embodiment 64 shown may be a thin piece or plate of generally resilient material having a generally symmetrical shape (i.e., a square shape). The material and thickness of the mass engaging member 64 may affect the flexibility of the mass engaging member 64. For example, the mass engaging member 64 may be made out of steel, beryllium copper, titanium or other elastic material. By way of further example, the generally flexible material of the mass engaging member 64 in dampers intended for optical tables may have a thickness range of about 0.01 inches to about 0.1 inches and a length and width of about 1 inch to about 20 inches. For example, in some cases, the mass engaging member 64 may have a thickness range of about 0.02 inch to about 0.06 inch. However, the materials, shapes and dimensions of the mass engaging member 64 are not limited to the examples disclosed herein, and any number of materials, shapes and dimensions may define the mass engaging member 64.

Other factors may also affect the mechanical compliance or effective flexibility of the mass engaging member 64. The amount of biased force, or pre-load force, applied by the load mechanism 74 and load plate member 72 onto the mass engaging member 64 may affect the flexibility of the mass engaging member 64. A pre-load force may be set upon tuning of the tunable damper 50 in order to shift or adjust the natural frequency of the damper and configure the tunable damper 50 to effectively damp-vibration in one or more ranges of resonance frequencies or other non-resonance frequencies of the object to which it secured. For example, the pre-load force, or biased force, that is applied by the load mechanism 74 and the load plate member 72 enables the engaging member supports 70 to apply a force along opposing ends of the mass engaging member 64, thereby affecting the flexibility of the mass engaging member 64. Furthermore, the effective flexibility of the mass engaging member 64 assists in defining the one or more frequency ranges of resonance vibration the tunable damper 50 may be able to damp.

FIG. 6 also shows a first pair of notches or features 65 generally along opposing sides of the mass engaging members 64 and 64' and a second pair of notches or features 77 generally along opposing sides of the engaging member supports 70. The first pair of notches or features 65 and second pair of notches or features 77 may assist in aligning the mass engaging members 64 within the tunable damper 50. For example, pins 73 (as shown in FIG. 3) may represent a pair of features or supports that interact or engage mechanically with the first pair of notches 65 in the mass engaging members 64 and 64' in order to align the adjacent mass engaging member 64 by mating the first pair of notches 65 of the mass engaging member 64 with the pins 73. This arrangement may secure the mass engaging member 64 in a substantially lateral fixed orientation relative to the adjacent engaging member supports 70. Furthermore, in an assembled state, the first pair of notches 65 engaged with the pins 73 enables the mass engaging members 64 and associated elements secured to the mass engaging members 64, such as the damper mass 62, to generally maintain a fixed orientation relative to, for example, the housing 52. In general, maintaining a fixed orientation of the mass engaging members 64 relative to the engaging member supports 70 and housing 52 may ensure proper functioning of the tunable damper 50 by preventing mechanical interference between the mass engaging members 64 and surrounding structures such as the housing. Although the first pair of notches 65 and second pair of notches 77 are illustrated as geometric cut-outs, any number of features or elements may be used to assist in aligning the mass engaging members 64 with at least the engaging member supports 70. Furthermore, the first pair of notches 65, second pair of notches 77, and pins may be incorporated in any of the tunable damper embodiments 20, 50, 150 disclosed herein.

Also shown in FIG. 6 are the relief holes 71 provided along the side of the base plate 56 which may be generally facing the adjacent mass engaging member 64'. The one or more relief holes 71 may provide additional space for fasteners 79 (e.g., screws, rivets, etc.), as shown in FIG. 3, that may be used to partially secure the mass engaging member 64 to the damper mass 62 in a sliding relationship that still allows relative movement between these components along direction $d_1$. That is, shafts of the fasteners 79 may be sized to slip through corresponding holes in the mass engaging members 64. As the damper mass 62 moves in response to resonance vibrations, additional clearance space may be necessary in order to prevent the fasteners 79 from butting up against adjacent elements, such as the base plate 56. Alternatively, the relief holes may be placed along any part within the tunable damper 50, such as the top plate 58 or load plate member 72, where a relief hole 71 is necessary to provide clearance for a feature, such as the fastener 79 described above. As such, the side of the load plate member 72 facing the adjacent mass engaging member 64 may include one or more relief holes 71.

Figure 12:
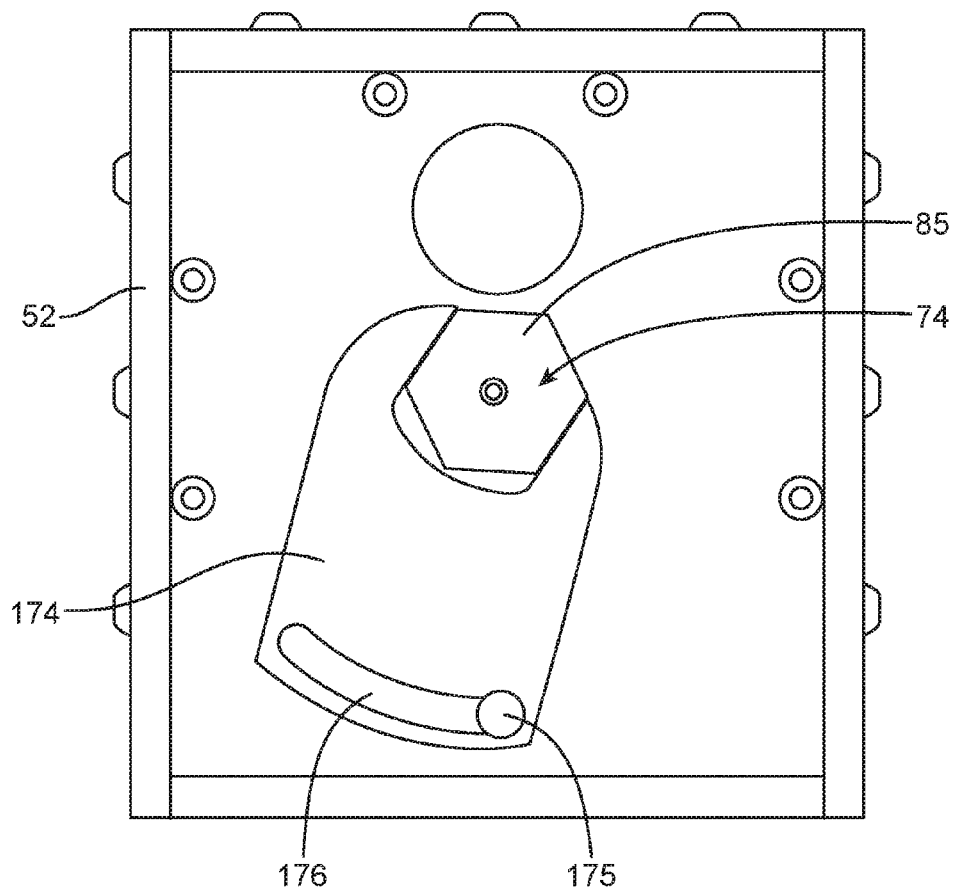
FIG. 12 illustrates a top view of an embodiment of a tunable damper with a cover plate of the damper removed to show an embodiment of a loading screw stop.

FIG. 7 also shows a set screw 75 that can assist in locking the load mechanism 74 in place after adjusting the load mechanism 74 to a desired position. However, any number of locking features may be used to generally lock the tunable damper 50 in the desired tuned configuration. For example, another embodiment of a locking mechanism is shown in FIG. 12. FIG. 12 illustrates an example embodiment of a loading stop 174 that may function to generally prevent deviation from of any one of the loading features from the positions set by tuning and which may be incorporated in any tunable damper embodiment. For example, and shown by way of example in FIG. 12, the loading stop 174 may be operatively coupled to the load mechanism 74. Additionally, the loading stop 174 may also interact with a stopping feature 175 such that the stopping feature 175 restricts the rotation of the load mechanism 74 by way of restricting the rotation of the loading stop 174. Furthermore, the stopping feature may be a type of fastener, such as a screw, that may secure the positioning of the loading stop 174 at a desired location. For example, a cutout slot 176 in the loading stop 174 may interact with a stopping feature 175 and define the range of rotation that the loading stop 174 and load mechanism 74 may rotate. By way of further example, once the loading stop 174 is in a desired position, the stopping feature 175 may be secure the loading stop 174 from further movement. In general, the loading stop 174 may assist a user in tuning the tunable damper within an acceptable range for the given tunable damper 50. As with any feature or function disclosed here, any feature or function described for at least one embodiment of the tunable damper 20, 50, and 150 may be incorporated in any one of the tunable damper embodiments disclosed herein.

It has also been contemplated that loading or pre-loading of tunable damper embodiments may be controlled and monitored electronically. For example, one or more force sensors such as a button type load cell may be incorporated in the tunable damper assembly 50 to sense the amount of force being applied by the one or more load plate members 72 onto the mass engaging members 64. Such a sensor may be positioned, for example, between the load mechanism 74 and the top plate 58 of the embodiment shown in FIG. 3, or the load mechanism 42 and the top plate 28 of the embodiment shown in FIG. 2, replacing the load interface 44. Additionally or alternatively, a proximity sensor can be placed inside the housing to monitor the position of the loading plate 72, e.g. as shown by item 82 in FIG. 3. An electronic readout may provide a user with information associated with the readings obtained by the one or more sensors. Furthermore, a user may use the sensor readings to ensure the proper amount of force is being applied by the one or more load plate members 72. In addition, electronic components may also be programmed to only allow the load plate members 72 to apply a force within a pre-defined range. Therefore, the pre-loading and tuning of the tunable damper may be electronically adjusted and controlled by one or more electronic and mechanical components in some cases.

Figure 11:
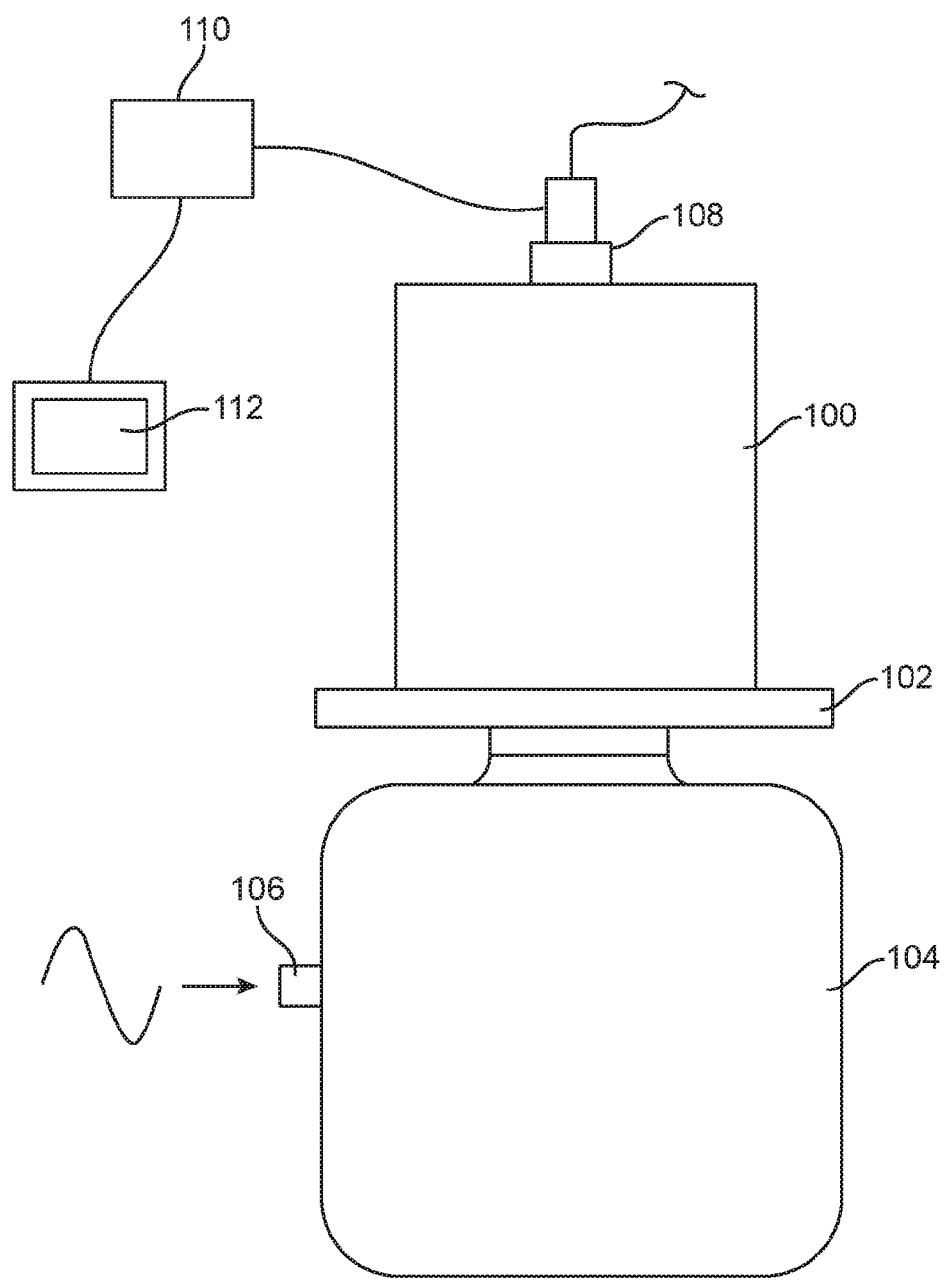
FIG. 11 is an elevation view of a tunable damper embodiment installed on a platform of a shaker.

Tuning of the tunable damper 50 may enable a user to adjust the tunable damper 50 so that it can generally damp vibration in one or more ranges of resonance frequencies. Additionally, the tunable damper 50 may be tuned or fine-tuned before, during and/or after operatively coupling the tunable damper 50 to an object, such as an optical table. The tunable damper 50 may be tuned using a number of methods and devices for tuning. For example, and shown by way of example in FIG. 11, at least one sensing device 108 such as accelerometers, geophones or laser interferometers may be coupled to or otherwise in communication with the housing or damper mass. In some embodiments, the sensing device 108 includes an accelerometer. Optionally, any variety of suitable sensing devices 82 may be used with the system embodiments discussed herein. Additional components may be connected in series or in parallel to the sensing device 108, such as, for example, a voltmeter 110 and a display screen 112, as shown in FIG. 11.

As discussed above, some methods of tuning the tunable damper may be based on adjusting its nominal frequency to a certain value. The nominal frequency, $f_0$, is the frequency defined by the tunable damper's damper mass and the effective stiffness of the mass engaging members. Referring to FIG. 3, these values are defined by the damper's damper mass, 62, and the stiffness of supporting assemblies, mainly the mass engaging members 64 together with highly damped elements 66.

Tuning may be implemented by changing the effective stiffness by means of pre-loading the mass engaging members 64. For example, the frequency range covered by adjusting the stiffness as described above, may be significant, such as in the order of about 100 Hz or more. By way of further example, the damping ratio, or the loss factor, η, may be relatively constant in the tunable frequency range and may generally stay within a desirable range, which is, approximately, 0.2 to 0.4 for some optical table applications. Both nominal frequency and loss factor may be estimated by analyzing the vibration transmissibility curves.

Figure 10:
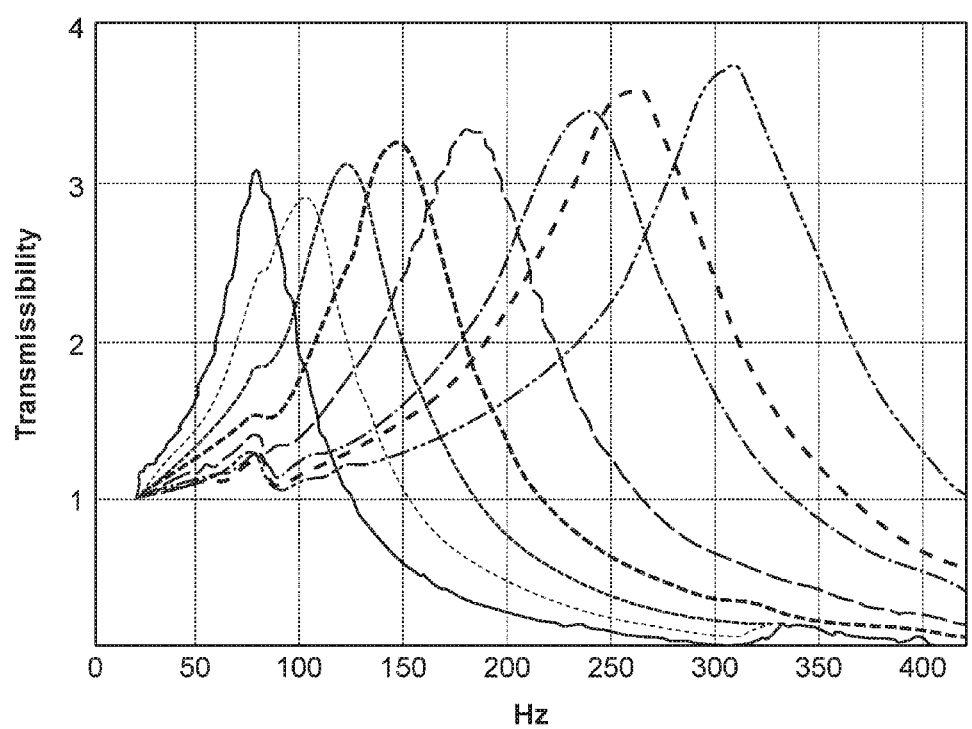
FIG. 10 is a graph showing transmissibility functions that represent a rate of vibration transmission in terms of ratios of acceleration, velocity or displacement from the base plate to the damper mass of the tunable damper of FIG. 3 and identify the damping factors by the height of the resonance peaks.

FIG. 10 shows the vibration transmissibility functions from the base plate 56 to the damper mass 62 of a tunable damper embodiment such as the tunable damper 50 embodiment shown in FIG. 3. These functions were obtained experimentally using two accelerometers and a signal analyzer. The vibration transmissibility functions represent the ratio of vibration amplitude of the moving mass 62 to the vibration amplitude of the base 56. The resonance maxima of these curves generally indicate the nominal tuning frequencies. Various curves correspond to varying positions of the load mechanism, from the most relaxed, represented by the solid line with the maximum at about 80 Hz, to the most stressed, represented by the dashed line with a maximum at about 310 Hz. The loss factor, η, may be measured by the inverse value to the resonance amplitude, Q. More precisely, $$\eta = 1/\sqrt{Q^2-1}$$

The data of FIG. 10 shows, therefore, that the loss factor may remain relatively constant and close to the recommended optimal value in a range of resonance frequencies (such as 80 Hz to 310 Hz) achieved by tuning the damper 50 via operation of the load mechanism 74, thereby illustrating the required range and performance of the damper. Traditional methods of tuning the damper to a given or desired frequency can be applied at least to the embodiments of the tunable damper embodiments described herein and shown by way of example at least in FIGS. 2 and 3. Optional additional methods of tuning the tunable damper to a given frequency is also presented herein and illustrated in FIG. 11. As shown, a tunable damper 100 may be installed on a platform 102 of a shaker 104. The tunable damper 100 may have any or all of the features, dimensions, and materials of the dampers 20, 50, 150 and may be similarly tuned. In some cases, the shaker 104 may comprise an electromagnetic shaker, however, any variety of shakers may be used without departing from the scope of this disclosure. The shaker 104 may be excited through the interconnect 106 coupled to at least one power supply (not shown). At least one accelerometer or other vibration sensor 108 may be installed on or otherwise in communication with the tunable damper 100 or the platform 102. In some embodiments, the platform 102 may be excited by a harmonic force with a fixed frequency and amplitude.

The resulting motion of the housing of the tunable damper 100 may depend on the natural frequency of the damper. By changing the effective spring stiffness or flexibility of the one or more mass engaging members 64 of the tunable damper 100 the user may be able to tune the resonance frequency of the damper 100. As a result, it may be possible to achieve a minimum value of the housing acceleration. Further, this minimum may correspond to the desired natural frequency, $f_0 = f_{tuned}$, if the excitation frequency, $f_{excitation}$, is in certain relationship with $f_{tuned}$. This relationship may be given by the formula:

$$f_{excitation} = f_{tuned} \cdot \sqrt{\frac{1+\eta^2}{2 \cdot a} \cdot \left[1 + a - \sqrt{(1-a)^2 + \frac{4 \cdot a \cdot \eta^2}{1+\eta^2}}\right]},$$

$$a = \frac{m_a + m_c}{m_a + m_c + m_d},$$

wherein $m_d$ represents the mass of the damper mass 62 of the tunable damper, $m_c$ represents the mass of the housing of the tunable damper 100, and $m_a$ represents the mass of the platform and moving armature of the shaker 104. The value of $\eta$ may be, as discussed above, relatively independent of frequency and may be determined from experimental data such as shown in FIG. 10. For the calculation of a, the value of $m_a$ may be determined from technical documentation of the shaker or from preliminary calibration tests. The formula above was derived from a mathematical model considering the movable mass of the shaker together with the housing of the tunable damper, as well as the damper mass of the tunable damper, as rigid bodies. Other relationships between $f_{excitation}$ and $f_{tuned}$ may be used, which may be derived from other appropriate models of the shaker and tunable damper assembly embodiments obtained analytically, numerically or experimentally using techniques known in the art. For example, the two frequencies may coincide.

By way of example, a method of tuning the tunable damper 100 may include the following steps. First, the excitation frequency, $f_{excitation}$, is defined for the required tuned frequency using the formula shown above or other adequate mathematical model of the shaker and damper assembly. Then the damper is installed on the platform of the shaker as show by way of example in FIG. 11. An accelerometer may then be attached to the housing of the damper or to the loading plate of the shaker. The signal from the accelerometer is supplied to a processing device, such as a multi-meter Agilent 34401A or other model. The shaker may then be driven by a constant amplitude AC current at frequency $f_{excitation}$, as described above. The pre-loading screw may then be operated or adjusted to the position providing minimum reading from the voltmeter which is indicative of the amplitude of the signal from the accelerometer. When the minimum voltmeter reading is achieved, the damper may be tuned to the required nominal frequency, $f_0 = f_{tuned}$.

As stated above, the tunable damper device embodiments may enable a user to adjust the damping characteristics of the tunable damper as needed, such as before, during, and/or after being operatively coupled to an object. At least some experimental tests have shown that the loss factor provided by the damped spring embodiments stay within some recommended limits of about 0.2 to about 0.4 in a wide frequency range (See FIG. 10). Furthermore, the symmetric design of the mass engaging members 64 and their arrangement around the damper mass 62 in a symmetric manner may prevent rotational motion of the damper mass 62, thereby ensuring full utilization of its inertia for vibration suppression in a defined direction and maximum effect of damping.

In addition, tunable damper devices presented herein may be configured to provide temperature-independent stiffness and high damping of elastic elements without using oil. In some embodiments, for example, the mass engaging members 64 comprise metal leaf springs for substantially stable temperature adjustable stiffness, and viscoelastic elastomeric materials in form of thin layers or pads working in shear and integrated with these springs to provide necessary damping. As a result, the present tunable damper systems may provide for a simple and reliable method and mechanism for tuning the tunable damper by changing the effective stiffness of springs or mass engaging members 64. As discussed above, this may be achieved by pre-loading the mass engaging members 64 using a mechanism such as the load mechanism 74. In process of pre-loading, the contact area of the mass engaging members 64 and engaging member supports 70 changes, thereby changing effective span and spring constant of the mass engaging members 64 that defines the stiffness.

Furthermore, the tunable damper embodiments described herein may be used as add-on devices to existing tables or other structures and may provide convenient means for tuning the tunable dampers in situ. Additionally, instead of multiple vibration excitations and measurements being necessary for tuning a tunable damper embodiment, the tunable damper embodiments disclosed herein may require only a simple tuning procedure involving only one type of measurement under a fixed harmonic excitation with only one vibration sensor, performed on the damper casing or an adjacent structure.

FIGS. 9 and 9A show an example of a tunable damper 50 assembled to an optical table 195 in a removable way. By way of example, an interface plate 201 may be attached to a top face-sheet 199 of an optical table 195 by a series of fasteners 197 as shown in FIG. 9. A top surface of the tunable damper 50 may then be covered with a layer of epoxy or other adhesive. The tunable damper may then be inserted in a matching cavity in the core of the optical table 195 and the bottom surface of the tunable damper 50 may be secured to the bottom face-sheet 203 of the optical table 195, such as by another series of fasteners similar to the fasteners 197. Once the tunable damper 50 is inserted in the optical table 195, the epoxy may be allowed to cure so that no significant stress will be exerted on the top face-sheet 199 that may jeopardize its flatness. Alternatively, the tunable damper 50 may be integrated into an optical table in a manner that may not allow easy removal from the table by epoxying it into a matching cavity in the core 196 of the table. FIG. 9 shows the tunable damper 50 in a vertical position for damping vertical vibration. Vertical vibration may be an important component of flexural vibration of a horizontal table. Alternatively, the tunable damper may be oriented in any desirable direction. Optical table 195 may also include a set of supporting legs or isolators 198 shown in FIG. 9A.

The tunable damper may be assembled to an object, such as an optical table 195, such that at least one access port 46 is accessible to a user, as shown by way of example in FIG. 9. FIG. 7 illustrates a front view of the tunable damper 50 showing an access port 46. The access port 46 may enable a user to access the load mechanism 74 and tune the tunable damper 50, as necessary, while installed in the table. For example, situations such as adding weight to the optical table or joining optical tables together may change the resonance frequency of the optical table of which the tunable damper 50 is operatively coupled to. The tunable damper 50 may be configured to provide at least the benefit of enabling a user to tune the tunable damper 50, such as by accessing and adjusting the load mechanism 74, while the tunable damper 50 is operatively coupled to the optical table. Alternatively, the tunable damper 50 may be de-coupled from the optical table for tuning, and then re-operatively coupled to the optical table 195.

With regard to the above detailed description, like reference numerals used therein refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description. Furthermore, any feature or function described for at least one embodiment of the tunable damper 20, 50, and 150 may be incorporated in at least any one of the tunable damper embodiments 20, 50 and 150 disclosed herein.

What is claimed is:

1. A method of reducing vibration in an object, comprising:
    operatively coupling one or more vibration sensors to the object;
    measuring vibration in the object with the vibration sensor and outputting the measured vibration characteristics on a display; and
    adjusting a load mechanism of a tunable damper assembly which is coupled to the object by adjusting a biasing force to at least one flexible mass engaging member of the tunable damper assembly so as to change an effective flexibility of a flat multiple layer laminate structure of the at least one flexible mass engaging member by changing a contact area between a sloped surface of an engaging member support and a damped element of the at least one flexible mass engaging member and so as to adjust a mechanical compliance of the flexible mass engaging member until a desired or acceptable measured vibration characteristic is displayed on the display.

2. The method of claim 1, wherein measuring vibration in the object comprises conducting a dynamic test including a dynamic compliance test of the object coupled to the tunable damper assembly.

3. The method of claim 1, wherein adjusting the load mechanism comprises turning a threaded member of the load mechanism so as to adjust the biasing force to the at least one flexible mass engaging member and adjust the mechanical compliance of the flexible mass engaging member.

4. The method of claim 1 further comprising reducing the effective flexibility of the at least one flexible mass engaging member by increasing the contact area between the sloped surface and the damped element.

5. The method of claim 1 further comprising locking a lock mechanism after adjusting the load mechanism.

6. The method of claim 1 wherein adjusting the load mechanism to further comprises accessing the load mechanism through an access port which is in communication with the load mechanism.

\* \* \* \* \*